United States Patent
Tomioka

(10) Patent No.: US 11,106,022 B2
(45) Date of Patent: Aug. 31, 2021

(54) ZOOM LENS AND IMAGING APPARATUS

(71) Applicant: FUJIFILM Corporation, Tokyo (JP)

(72) Inventor: Ukyo Tomioka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 59 days.

(21) Appl. No.: 16/794,543

(22) Filed: Feb. 19, 2020

(65) Prior Publication Data
US 2020/0271908 A1    Aug. 27, 2020

(30) Foreign Application Priority Data

Feb. 21, 2019  (JP) .............................. JP2019-029592

(51) Int. Cl.
*G02B 15/14* (2006.01)
*G02B 27/00* (2006.01)
*G02B 13/02* (2006.01)
*G02B 9/36* (2006.01)
*H04N 5/225* (2006.01)

(52) U.S. Cl.
CPC ....... *G02B 15/144109* (2019.08); *G02B 9/36* (2013.01); *G02B 13/02* (2013.01); *G02B 27/005* (2013.01); *H04N 5/2254* (2013.01)

(58) Field of Classification Search
CPC .............................................. G02B 15/144109
USPC ........................................................ 359/688
See application file for complete search history.

(56) References Cited

U.S. PATENT DOCUMENTS

| | | | | |
|---|---|---|---|---|
| 2013/0342716 A1* | 12/2013 | Yamamoto | ............. | G02B 13/18 348/208.11 |
| 2014/0029111 A1* | 1/2014 | Shibata | .......... | G02B 15/144109 359/686 |
| 2015/0260968 A1* | 9/2015 | Ohashi | ................... | G02B 15/17 348/143 |

FOREIGN PATENT DOCUMENTS

JP          2004-126631 A       4/2004

* cited by examiner

*Primary Examiner* — Darryl J Collins
(74) *Attorney, Agent, or Firm* — Studebaker & Brackett PC

(57) ABSTRACT

The zoom lens consists of, in order from an object side, a positive first lens group, a negative second lens group, a negative third lens group, and a positive fourth lens group. During zooming from a wide-angle end to a telephoto end, the second lens group moves to an image side, and the third lens group moves to the image side after moving to the object side. The fourth lens group consists of, in order from the object side, a positive fourth A lens group, a negative fourth B lens group moving during image blur correction, a positive fourth C lens group, a fourth D lens group moving during focusing, and a fourth E lens group having a refractive power with a sign different from that of a refractive power of the fourth D lens group.

17 Claims, 18 Drawing Sheets

EXAMPLE 1

FIG. 3
EXAMPLE 1
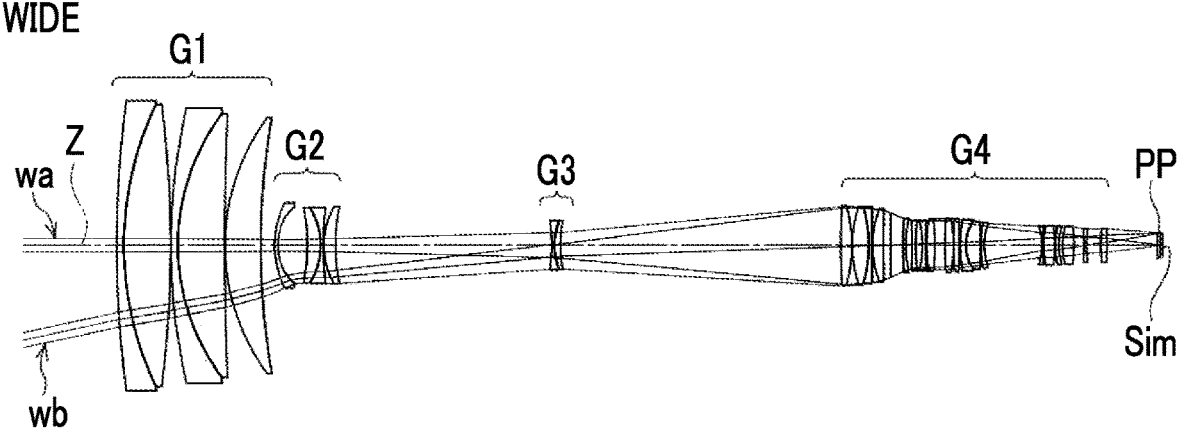
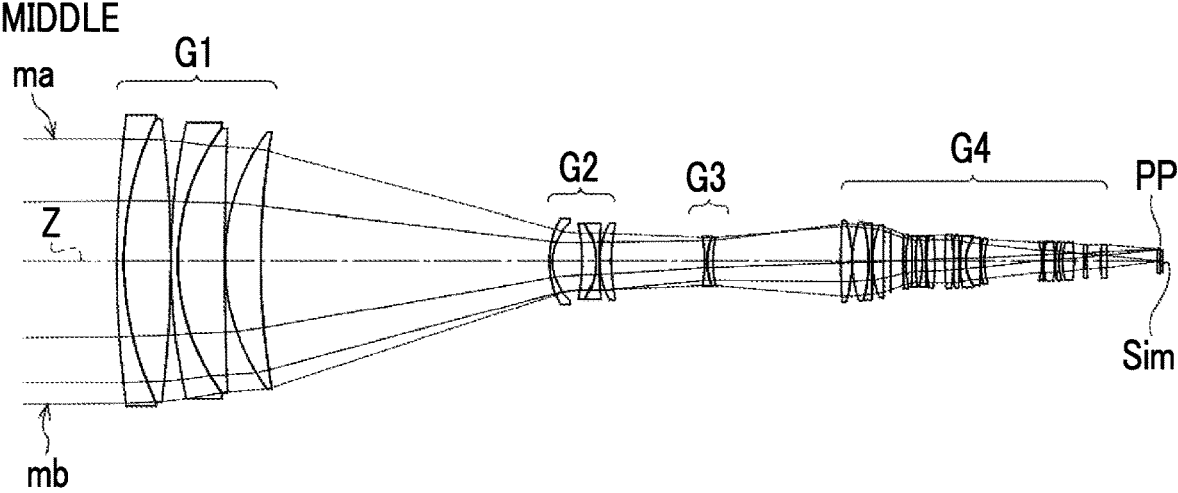
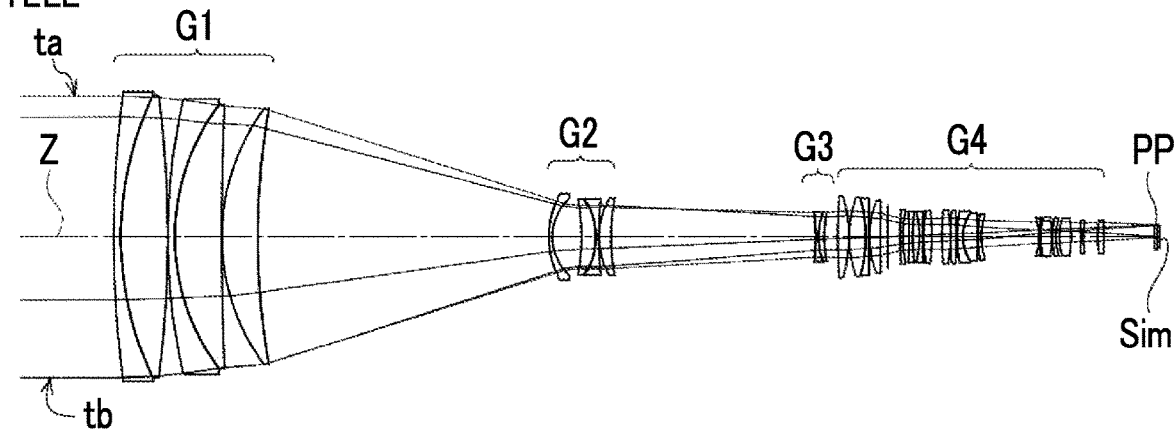

EXAMPLE 2

EXAMPLE 3

EXAMPLE 4

FIG. 8
EXAMPLE 1
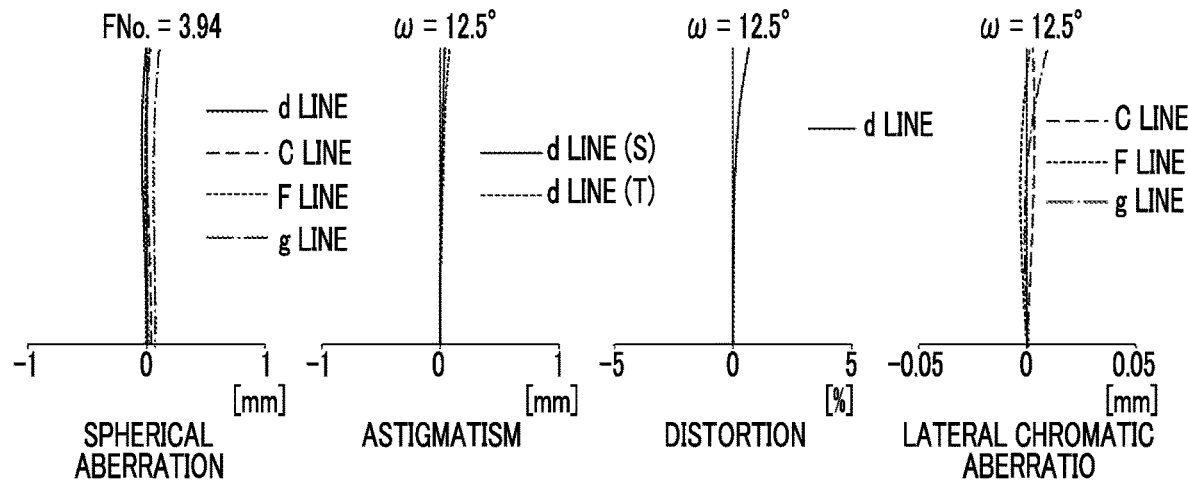
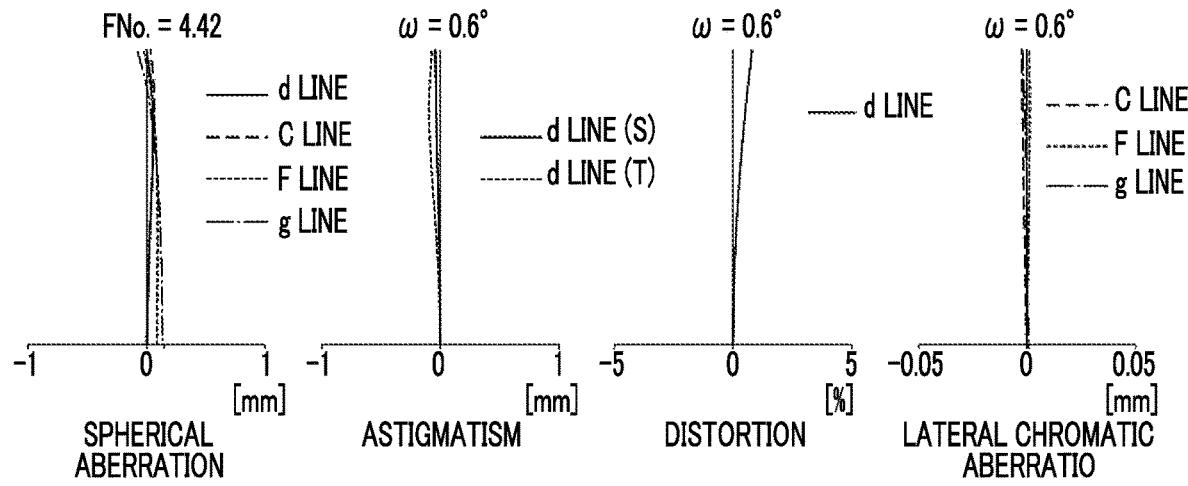
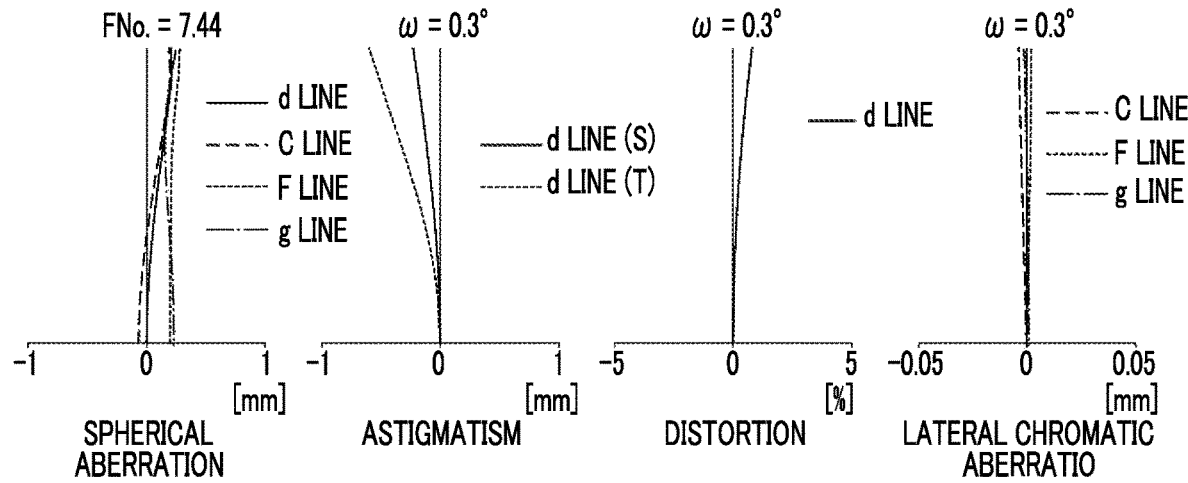

FIG. 9
EXAMPLE 1
NO OPTICAL SYSTEM TILT
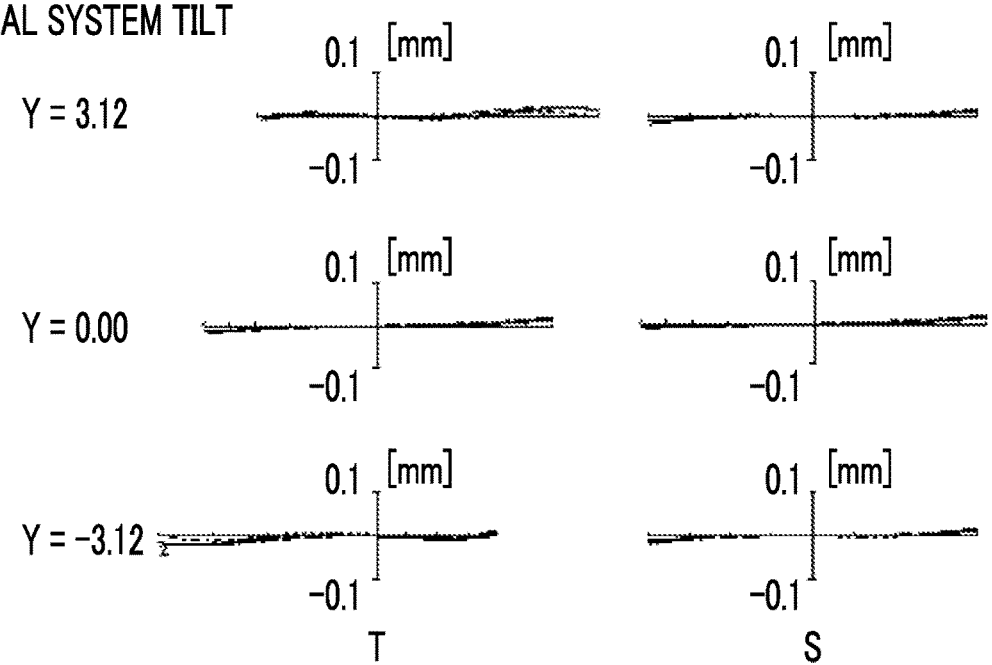
OPTICAL SYSTEM TILT 0.2° CORRECTION
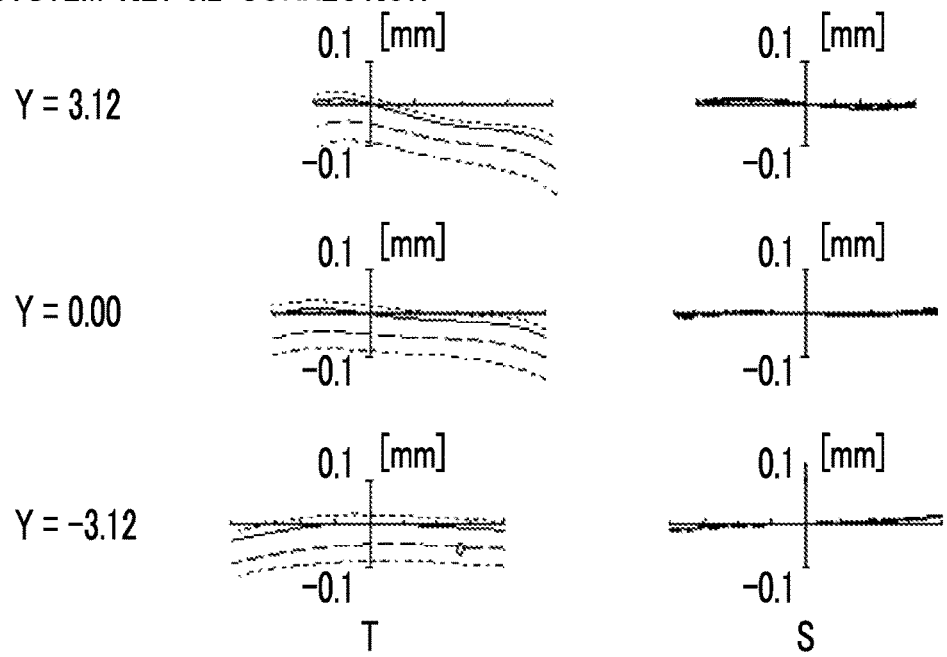

FIG. 10
EXAMPLE 2
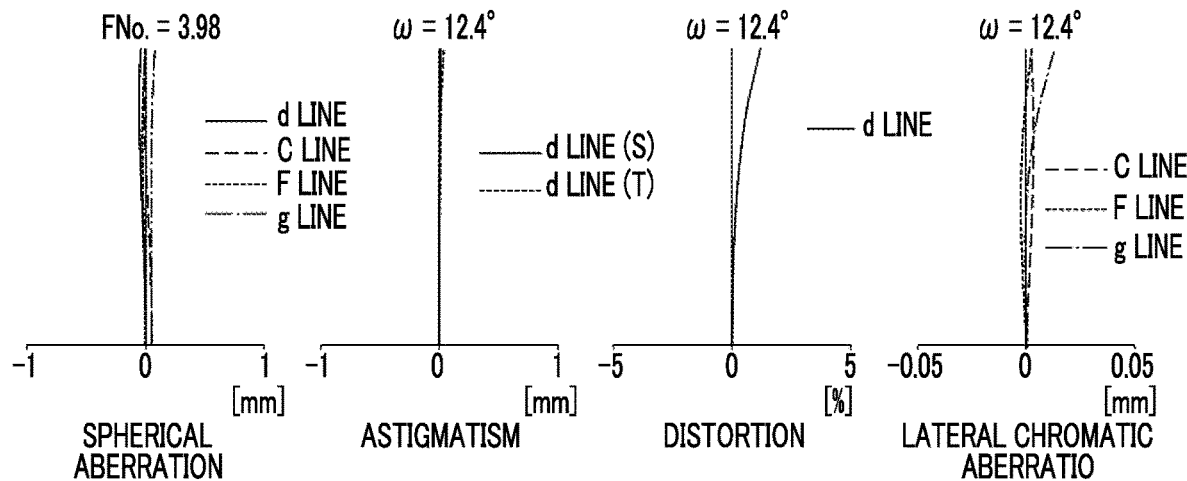
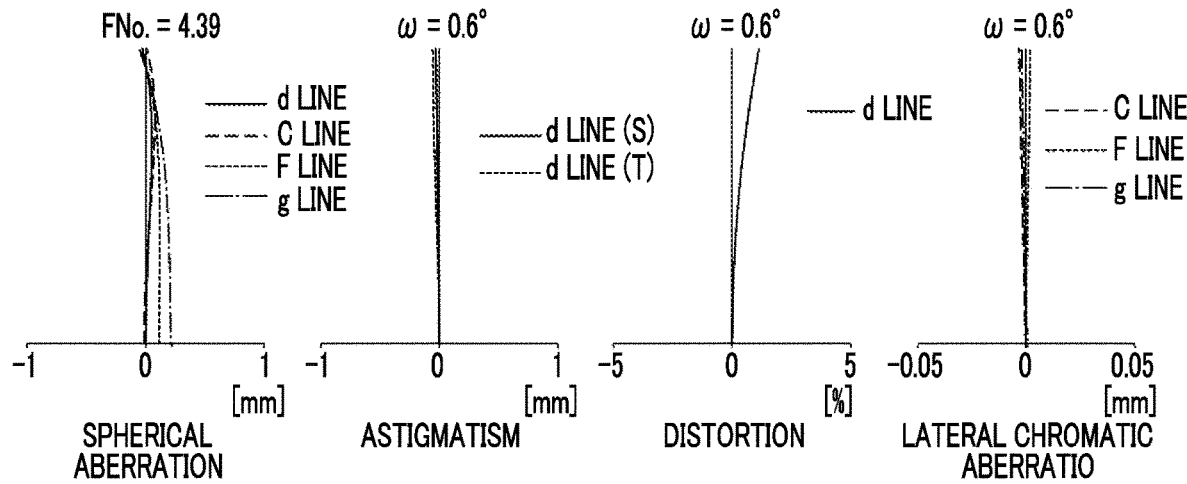
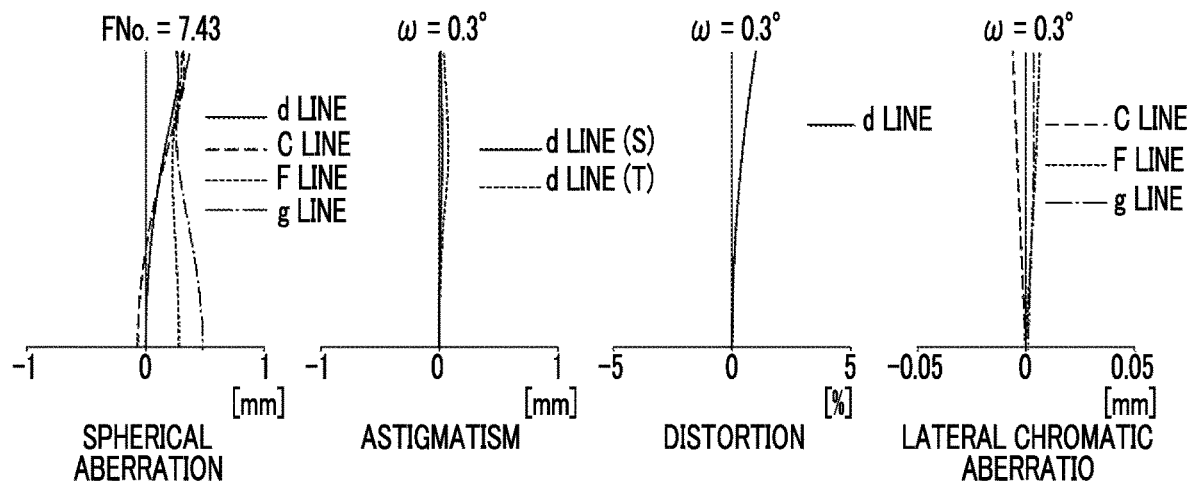

FIG. 11
EXAMPLE 2
NO OPTICAL SYSTEM TILT
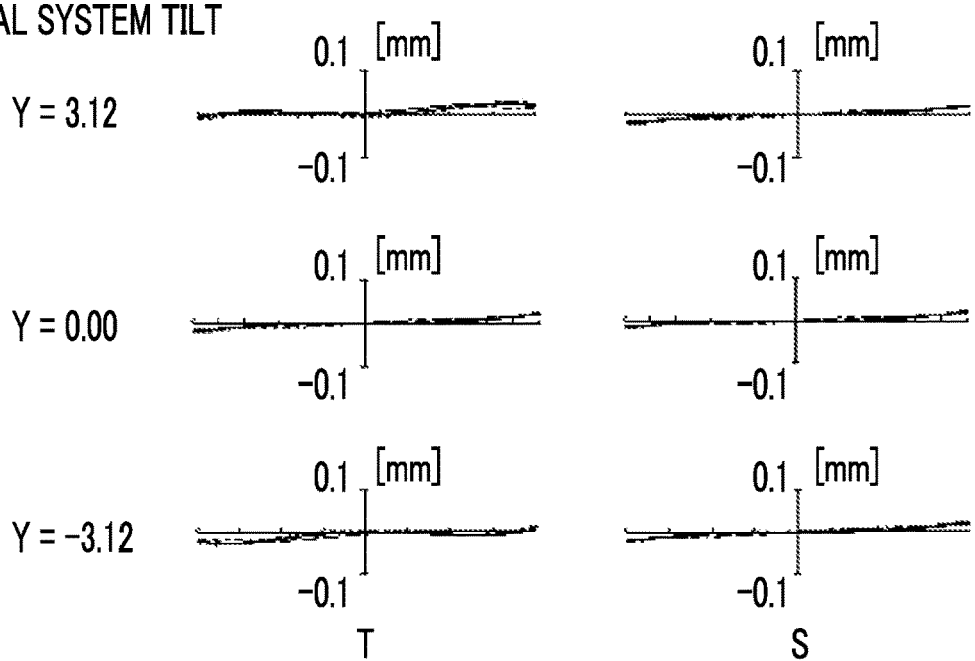
OPTICAL SYSTEM TILT 0.2° CORRECTION
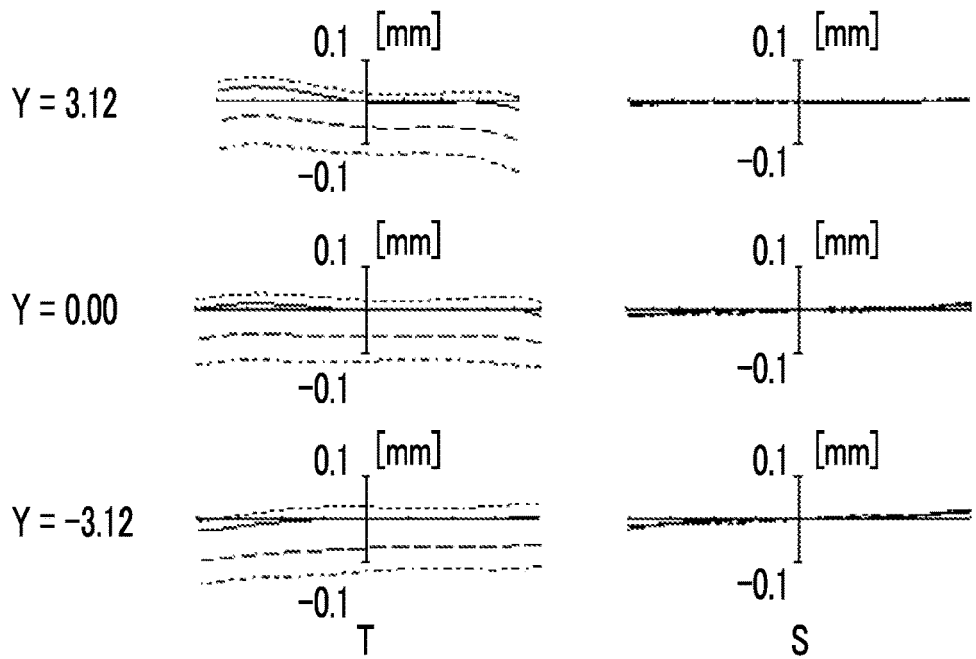

FIG. 12
EXAMPLE 3
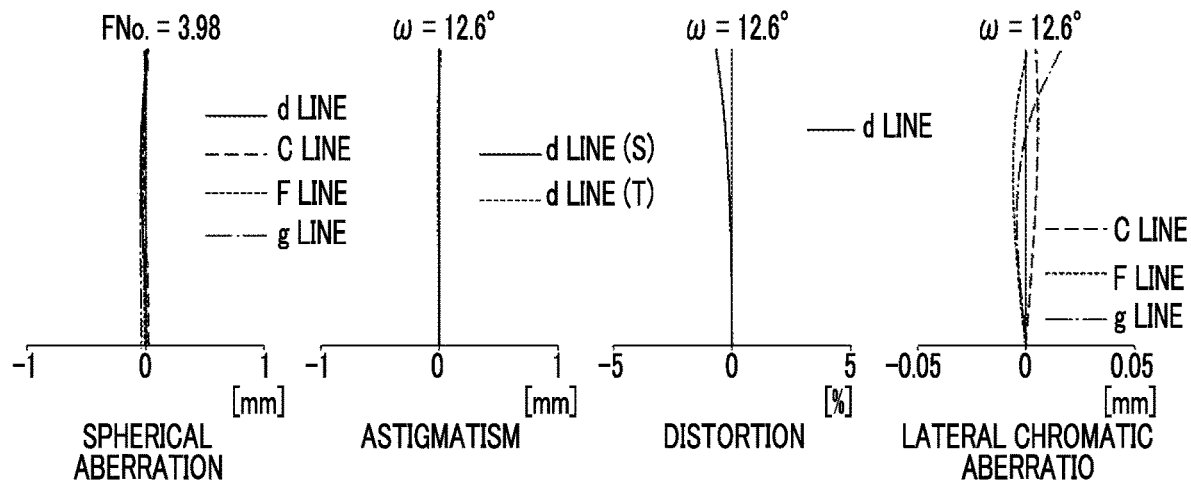
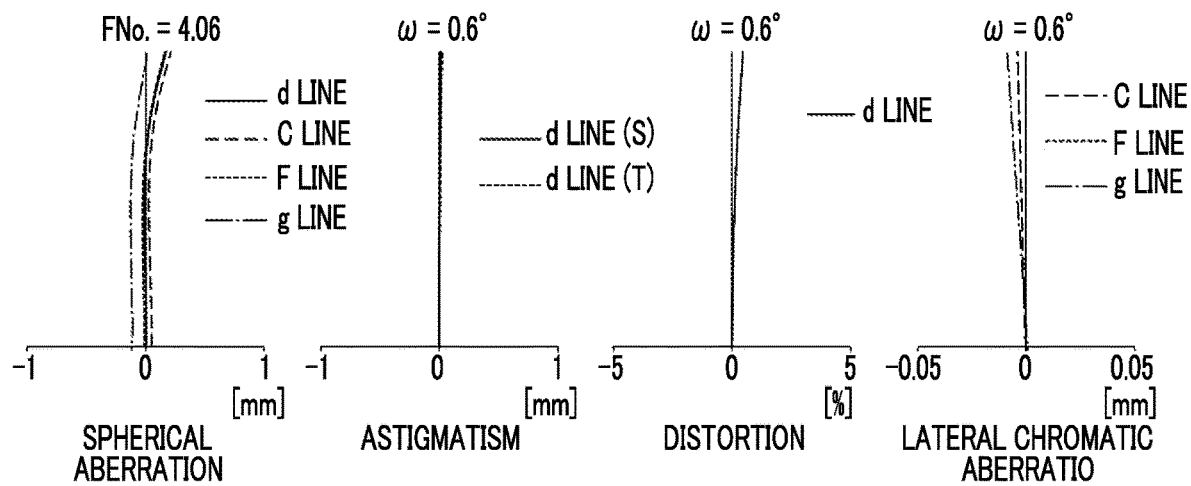
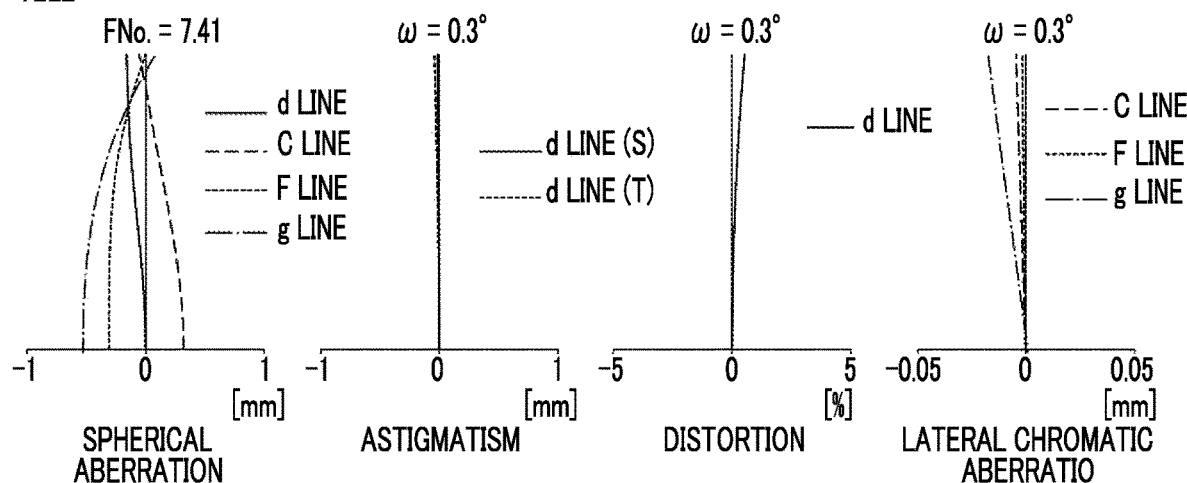

FIG. 13
EXAMPLE 3
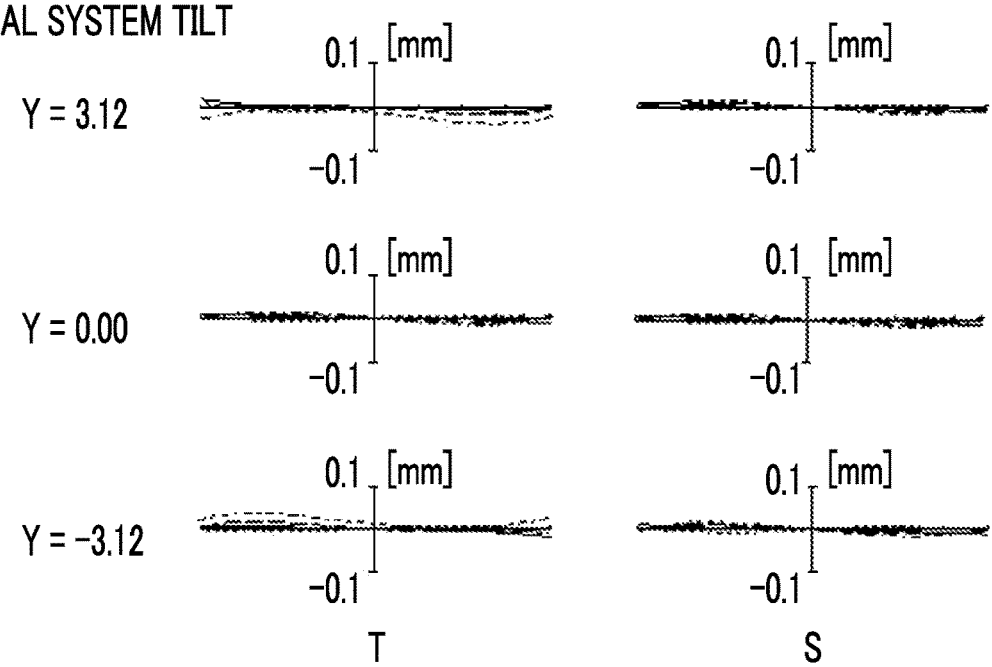
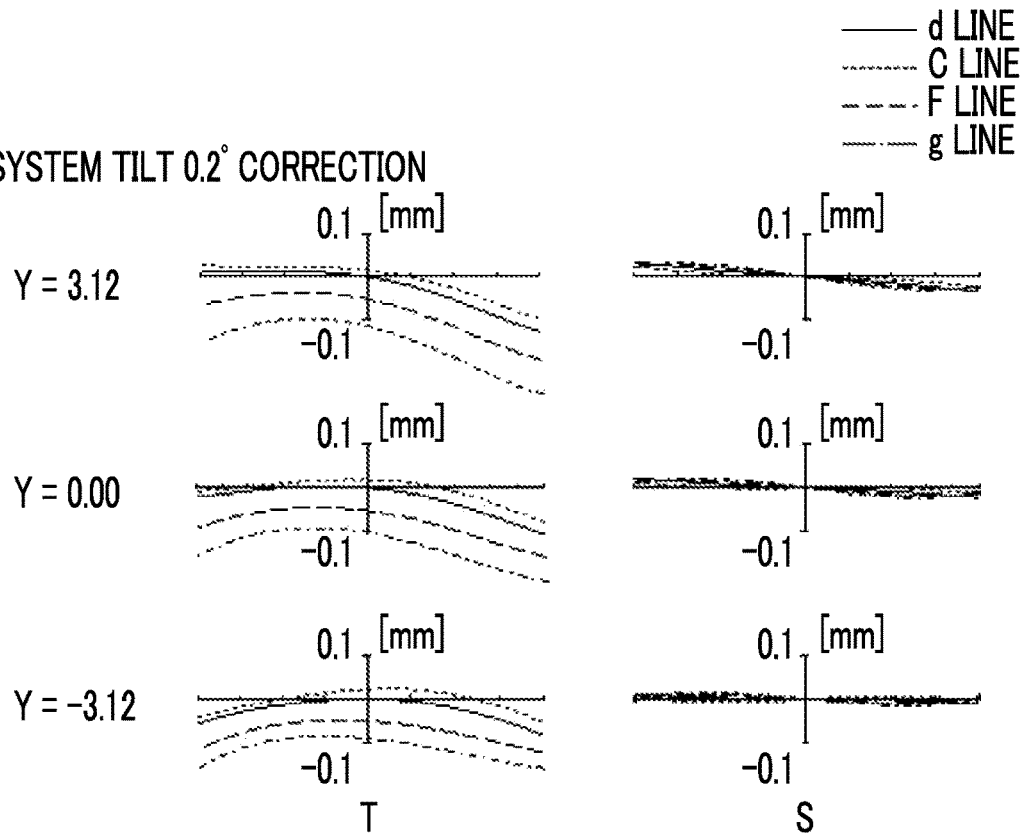

FIG. 14
EXAMPLE 4
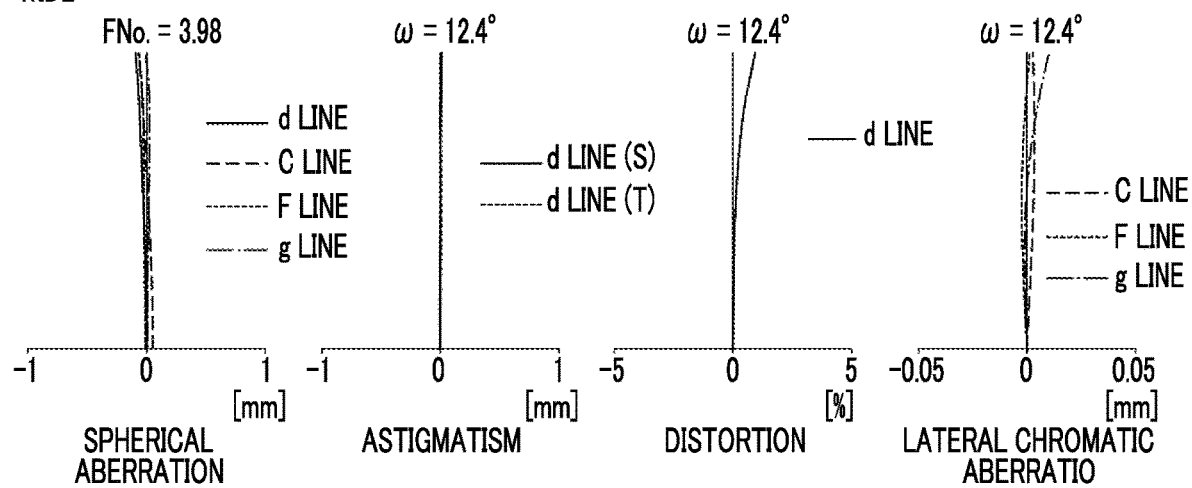
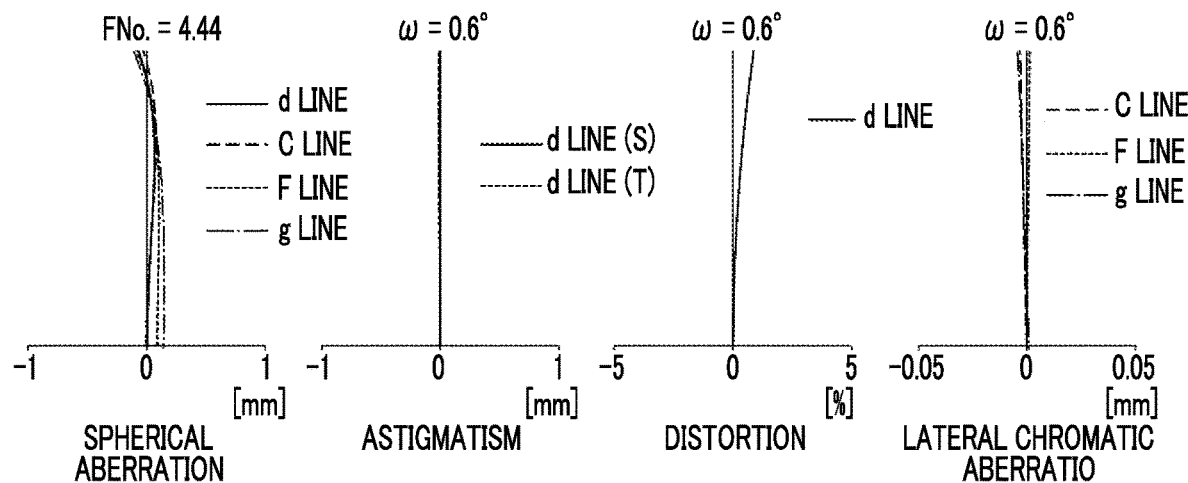
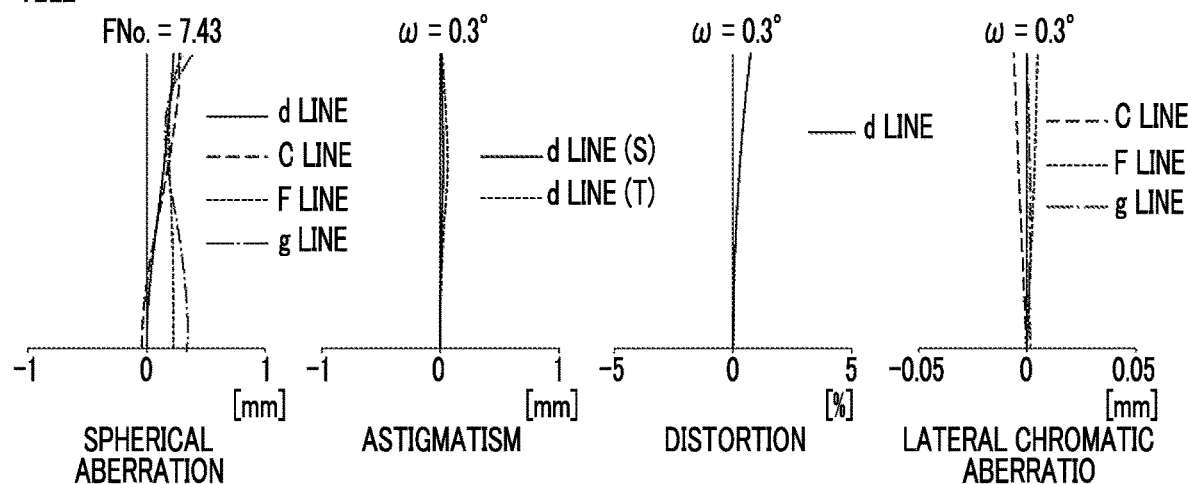

FIG. 15
EXAMPLE 4
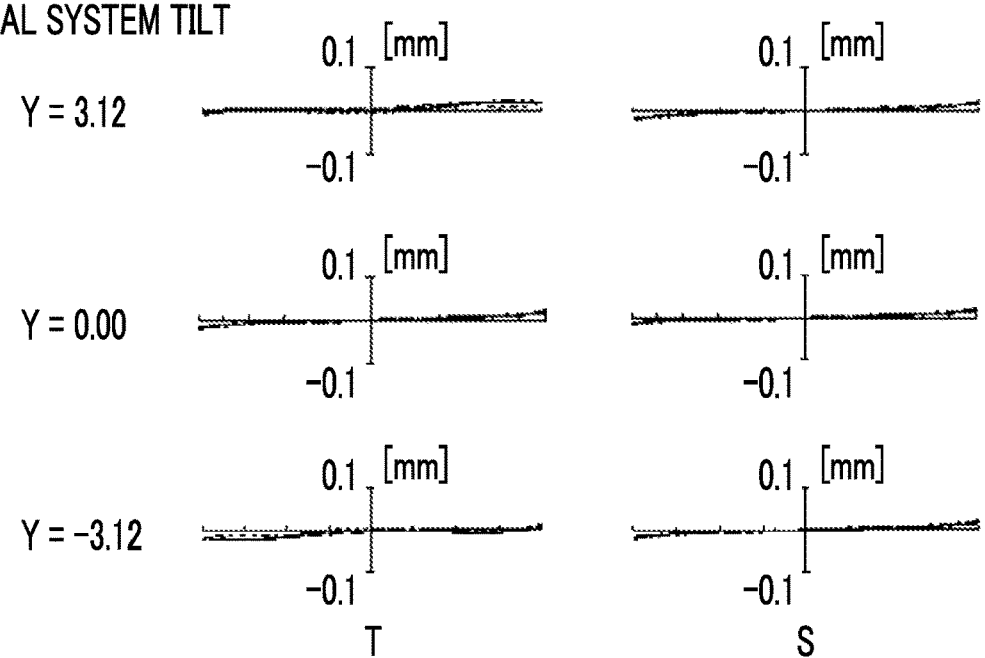
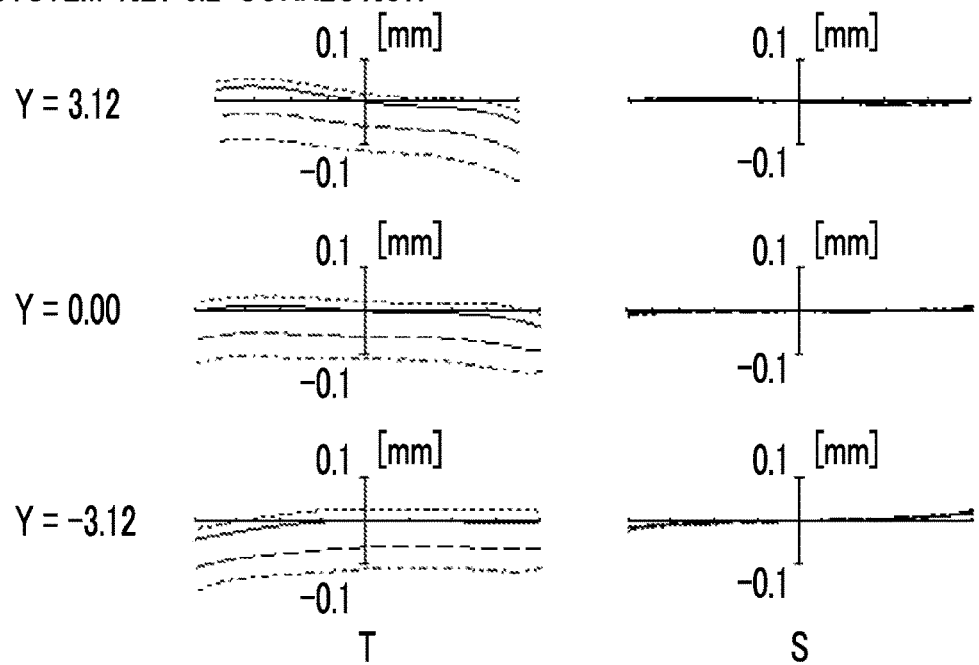

FIG. 16
EXAMPLE 5
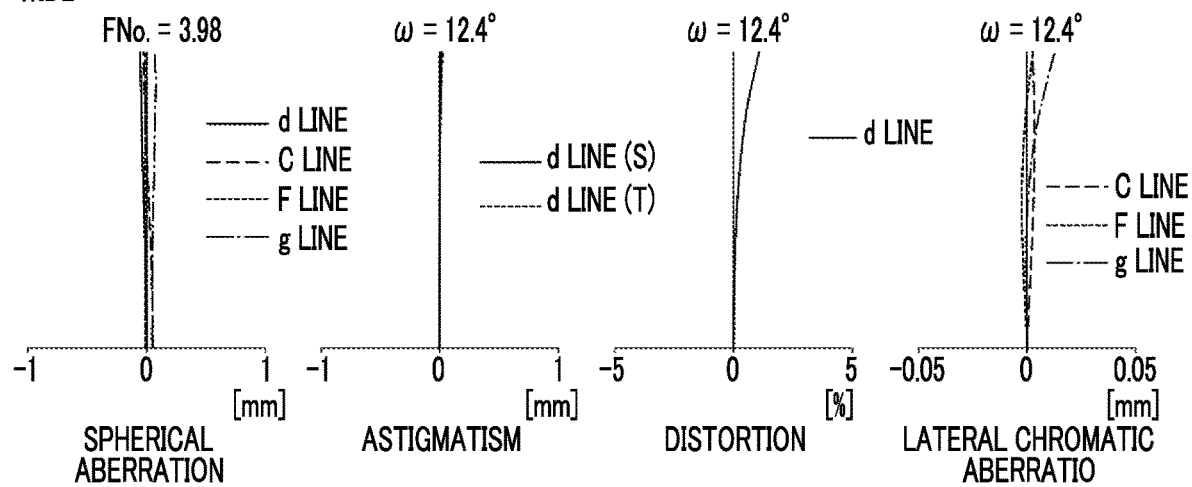
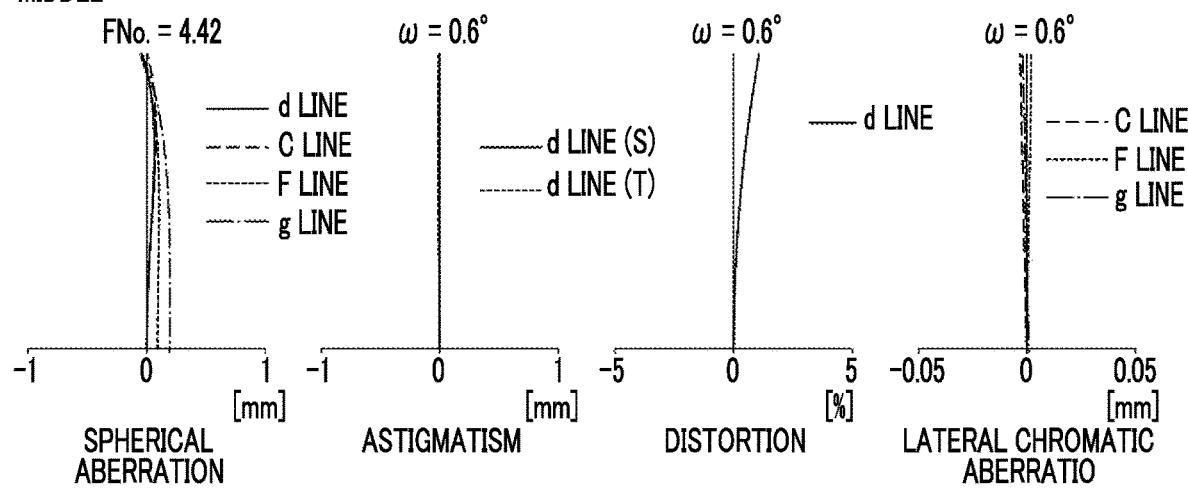
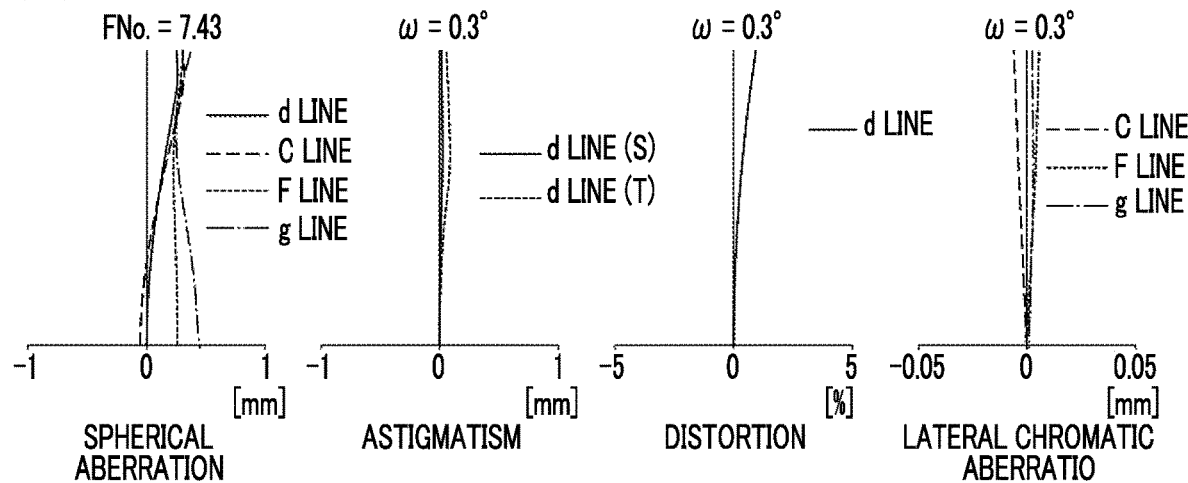

FIG. 17
EXAMPLE 5
NO OPTICAL SYSTEM TILT
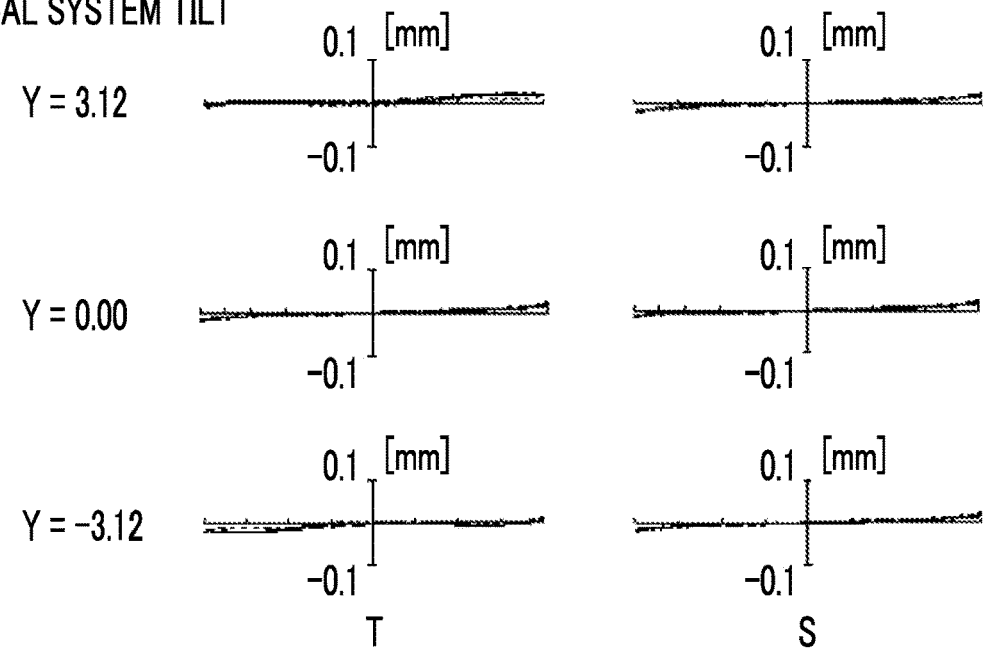
OPTICAL SYSTEM TILT 0.2° CORRECTION
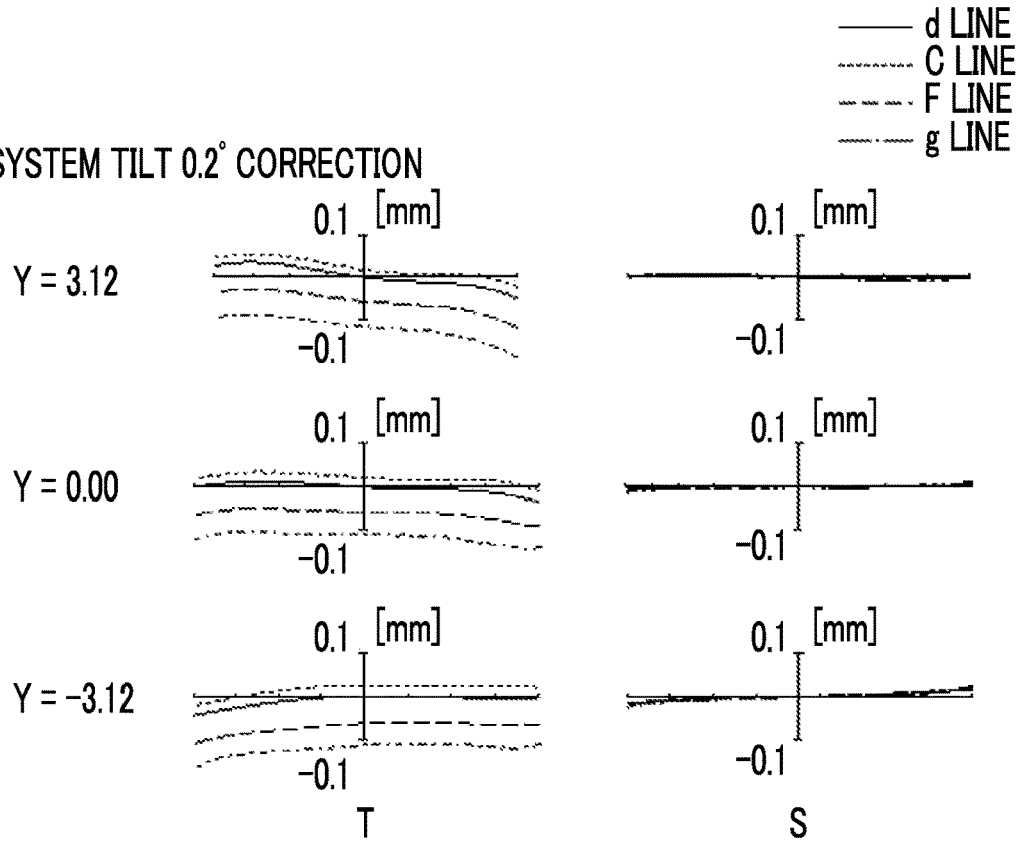

ZOOM LENS AND IMAGING APPARATUS

CROSS-REFERENCE TO RELATED APPLICATIONS

The present application claims priority under 35 U.S.C. § 119 to Japanese Patent Application No. 2019-029592, filed on Feb. 21, 2019. The above application is hereby expressly incorporated by reference, in its entirety, into the present application.

BACKGROUND OF THE INVENTION

1. Field of the Invention

The present disclosure relates to a zoom lens and an imaging apparatus.

2. Description of the Related Art

In the related art, various zoom lenses have been proposed as lens systems used for television cameras, video cameras, surveillance cameras, and the like. For example, JP2004-126631A discloses a zoom lens composed of four groups having, in order from an object side; a first group that has a positive refractive power; a second group that has a negative refractive power and moves during zooming; a third group that has a negative refractive power and moves during zooming; and a fourth group that has a positive refractive power and remains stationary during zooming, as a zoom lens applicable to television cameras.

SUMMARY OF THE INVENTION

In the zoom lens composed of four groups in which the refractive powers of the second group and the third group that move during zooming are made negative as disclosed in JP2004-126631A, a divergence effect of these two lens groups is enhanced and the fourth lens group disposed on an image side is likely to increase in diameter. Therefore, it is desirable to optimize the configuration and reduce a size of a lens system. Since an optical system tends to increase in size as a focal length becomes longer, a reduction in size is an important issue particularly in a zoom lens having a long focal length.

In the zoom lens having the long focal length, it is also an issue to correct image blurring caused by vibration and camera shake due to imaging environment, and it is desirable to comprise a lens group that moves in a case of correcting image blurring (hereinafter, referred to as a vibration reduction lens group).

On the other hand, a zoom lens having a focusing function becomes common. JP2004-126631A does not disclose a lens group that moves during focusing (hereinafter, referred to as a focusing lens group), but a lens system similar to the lens system of JP2004-126631A has a configuration in which the focusing lens group is provided in the first group. However, the configuration in which the focusing lens group is provided in the first group having a large aperture and a large mass is disadvantageous in an increase in speed of autofocus, and is disadvantageous in surveillance camera applications that require durability of a focusing mechanism.

The present disclosure has been made in view of the above circumstances, and an object thereof is to provide a zoom lens that is capable of reducing the size thereof while achieving an increase in focal length on a telephoto side and that comprises a vibration reduction lens group and a focusing lens group having a small diameter so as to have favorable optical performance, and an imaging apparatus comprising the zoom lens.

A zoom lens according to an aspect of the present disclosure consists of, in order from an object side to an image side: a first lens group that has a positive refractive power; a second lens group that has a negative refractive power; a third lens group that has a negative refractive power; and a fourth lens group that has a positive refractive power. The fourth lens group includes only five lens groups, as lens groups, which consists of, in order from the object side to the image side, a fourth A lens group which has a positive refractive power, a fourth B lens group which has a negative refractive power and moves in a direction intersecting with an optical axis during image blur correction, a fourth C lens group which has a positive refractive power, a fourth D lens group which moves along the optical axis during focusing, and a fourth E lens group which has a refractive power with a sign different from that of a refractive power of the fourth D lens group. A stop is disposed on the image side from a surface closest to the image side in the third lens group. During zooming from a wide-angle end to a telephoto end, the second lens group moves to the image side, the third lens group moves to the image side after moving to the object side, and the first lens group, the stop, the fourth A lens group, the fourth B lens group, the fourth C lens group, and the fourth E lens group remain stationary with respect to an image plane. During image blur correction, the fourth A lens group and the fourth C lens group remain stationary with respect to the image plane. During focusing, the lens groups other than the fourth D lens group remain stationary with respect to the image plane. It is assumed that a composite focal length of the fourth A lens group, the fourth B lens group, and the fourth C lens group is f4ABC, and a focal length of the fourth D lens group is f4D. Conditional Expression (1) is satisfied.

$$0.5 < |f4ABC/f4D| < 3 \tag{1}$$

In the zoom lens of the present aspect of the present disclosure, it is preferable to satisfy Conditional Expression (1-1).

$$0.8 < |f4ABC/f4D| < 1.5 \tag{1-1}$$

In the zoom lens of the above aspect of the present disclosure, assuming that a focal length of the second lens group is f2 and a focal length of the third lens group is f3, it is preferable to satisfy Conditional Expression (2), and it is more preferable to satisfy Conditional Expression (2-1).

$$0.4 < f2/f3 < 1.5 \tag{2}$$

$$0.5 < f2/f3 < 0.9 \tag{2-1}$$

In the zoom lens of the above aspect of the present disclosure, it is preferable that the second lens group includes a cemented lens formed by cementing a positive lens and a negative lens in order from the object side and having a cemented surface concave toward the object side.

In the zoom lens of the above aspect of the present disclosure, assuming that a lateral magnification of the fourth B lens group at the telephoto end in a state where an object at infinity is in focus is β4B, and a composite lateral magnification of the fourth C lens group, the fourth D lens group, and the fourth E lens group at the telephoto end in a state where the object at infinity is in focus is β4CDE, it is preferable to satisfy Conditional Expression (3), and it is more preferable to satisfy Conditional Expression (3-1).

$$-5 < (1-\beta 4B) \times \beta 4CDE < -1 \tag{3}$$

$$-4 < (1-\beta 4B) \times \beta 4CDE < -1.5 \tag{3-1}$$

In the zoom lens of the above aspect of the present disclosure, assuming that a lateral magnification of the fourth D lens group at the telephoto end in a state where an object at infinity is in focus is β4D, and a lateral magnification of the fourth E lens group at the telephoto end in a state where the object at infinity is in focus is β4E, it is preferable to satisfy Conditional Expression (4), and it is more preferable to satisfy Conditional Expression (4-1).

$$0.5<|(1-\beta 4D^2)\times \beta 4E^2|<4 \qquad (4)$$

$$1.5<|(1-\beta 4D^2)\times \beta 4E^2|<2.8 \qquad (4-1)$$

In the zoom lens of the above aspect of the present disclosure, it is preferable that the stop is disposed between the fourth A lens group and the fourth B lens group.

In the zoom lens of the above aspect of the present disclosure, it is preferable that the number of lenses composing the fourth D lens group is four or less.

In the zoom lens of the above aspect of the present disclosure, the fourth D lens group has a negative refractive power, and the fourth E lens group has a positive refractive power. In this configuration, assuming that a composite focal length of the fourth A lens group, the fourth B lens group, and the fourth C lens group is f4ABC, and a focal length of the fourth D lens group is f4D, it is preferable to satisfy Conditional Expression (5), and it is more preferable to satisfy Conditional Expression (5-1).

$$-3<f4ABC/f4D<-0.6 \qquad (5)$$

$$-1.4<f4ABC/f4D<-0.7 \qquad (5-1)$$

In the zoom lens of the above aspect of the present disclosure, the fourth A lens group may consist of, in order from the object side to the image side, a single lens which has a positive refractive power, a cemented lens which has a positive refractive power as a whole, and a single lens which has a positive refractive power, and the cemented lens of the fourth A lens group may be formed by cementing a biconvex lens and a negative lens in order from the object side.

In the zoom lens of the above aspect of the present disclosure, the fourth B lens group may consist of three single lenses each of which has a negative refractive power and one positive lens, and two single lenses among the three single lenses each of which has a negative refractive power may be successively disposed in order from a position closest to the object side in the fourth B lens group.

An imaging apparatus according to another aspect of the present disclosure comprises the zoom lens of the above-mentioned aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~group that has a positive refractive power" in the present specification means that the group has a positive refractive power as a whole. Likewise, the term "~group having a negative refractive power" means that the group has a negative refractive power as a whole. The term "a lens having a positive refractive power" and the term "a positive lens" are synonymous. The term "a lens having a negative refractive power" and the term "a negative lens" are synonymous. The "lens group" is not limited to a configuration using a plurality of lenses, but may consist of only one lens.

A single lens is one lens that is not cemented. However, a compound aspheric lens (a lens which is integrally composed of a spherical lens and a film having an aspheric shape formed on the spherical lens, and functions as one aspheric lens as a whole) is not be considered as a cemented lens, and is treated as a single lens. The sign of the refractive power and the surface shape of the lens surface of a lens including an aspheric surface are considered in terms of the paraxial region unless otherwise noted.

The "focal length" used in a conditional expression is a paraxial focal length. The value used in a conditional expression is a value in the case of using the d line as a reference in a state where the object at infinity is in focus. The "d line", "C line", "F line", and "g line" described in the present specification are emission lines. The wavelength of the d line is 587.56 nm (nanometers), the wavelength of the C line is 656.27 nm (nanometers), the wavelength of the F line is 486.13 nm (nanometers), and the wavelength of the g line is 435.84 nm (nanometers). "High-order" of aberration means fifth or higher order.

According to the present disclosure, it is possible to provide a zoom lens that is capable of reducing the size thereof while achieving an increase in focal length on the telephoto side and that comprises a vibration reduction lens group and a focusing lens group having a small diameter so as to have favorable optical performance, and an imaging apparatus comprising the zoom lens.

BRIEF DESCRIPTION OF THE DRAWINGS

FIG. 3 is a cross-sectional view showing configurations and rays of the zoom lens shown in FIG. 1 in each zoom state.

FIG. 8 shows spherical aberration diagrams, astigmatism diagrams, distortion diagrams, and lateral chromatic aberration diagrams of the zoom lens of Example 1 of the present disclosure.

FIG. 9 is a lateral aberration diagram at the telephoto end of the zoom lens according to Example 1 of the present disclosure in a case where the optical system is not tilted and in a case where the optical system is tilted and image blurring is corrected.

FIG. 10 shows spherical aberration diagrams, astigmatism diagrams, distortion diagrams, and lateral chromatic aberration diagrams of the zoom lens of Example 2 of the present disclosure.

FIG. 11 is a lateral aberration diagram at the telephoto end of the zoom lens according to Example 2 of the present disclosure in a case where the optical system is not tilted and in a case where the optical system is tilted and image blurring is corrected.

FIG. 12 shows spherical aberration diagrams, astigmatism diagrams, distortion diagrams, and lateral chromatic aberration diagrams of the zoom lens of Example 3 of the present disclosure.

FIG. 13 is a lateral aberration diagram at the telephoto end of the zoom lens according to Example 3 of the present disclosure in a case where the optical system is not tilted and in a case where the optical system is tilted and image blurring is corrected.

FIG. 14 shows spherical aberration diagrams, astigmatism diagrams, distortion diagrams, and lateral chromatic aberration diagrams of the zoom lens of Example 4 of the present disclosure.

FIG. 15 is a lateral aberration diagram at the telephoto end of the zoom lens according to Example 4 of the present disclosure in a case where the optical system is not tilted and in a case where the optical system is tilted and image blurring is corrected.

FIG. 16 shows spherical aberration diagrams, astigmatism diagrams, distortion diagrams, and lateral chromatic aberration diagrams of the zoom lens of Example 5 of the present disclosure.

FIG. 17 is a lateral aberration diagram at the telephoto end of the zoom lens according to Example 5 of the present disclosure in a case where the optical system is not tilted and in a case where the optical system is tilted and image blurring is corrected.

DESCRIPTION OF THE PREFERRED EMBODIMENTS

Figure 1:
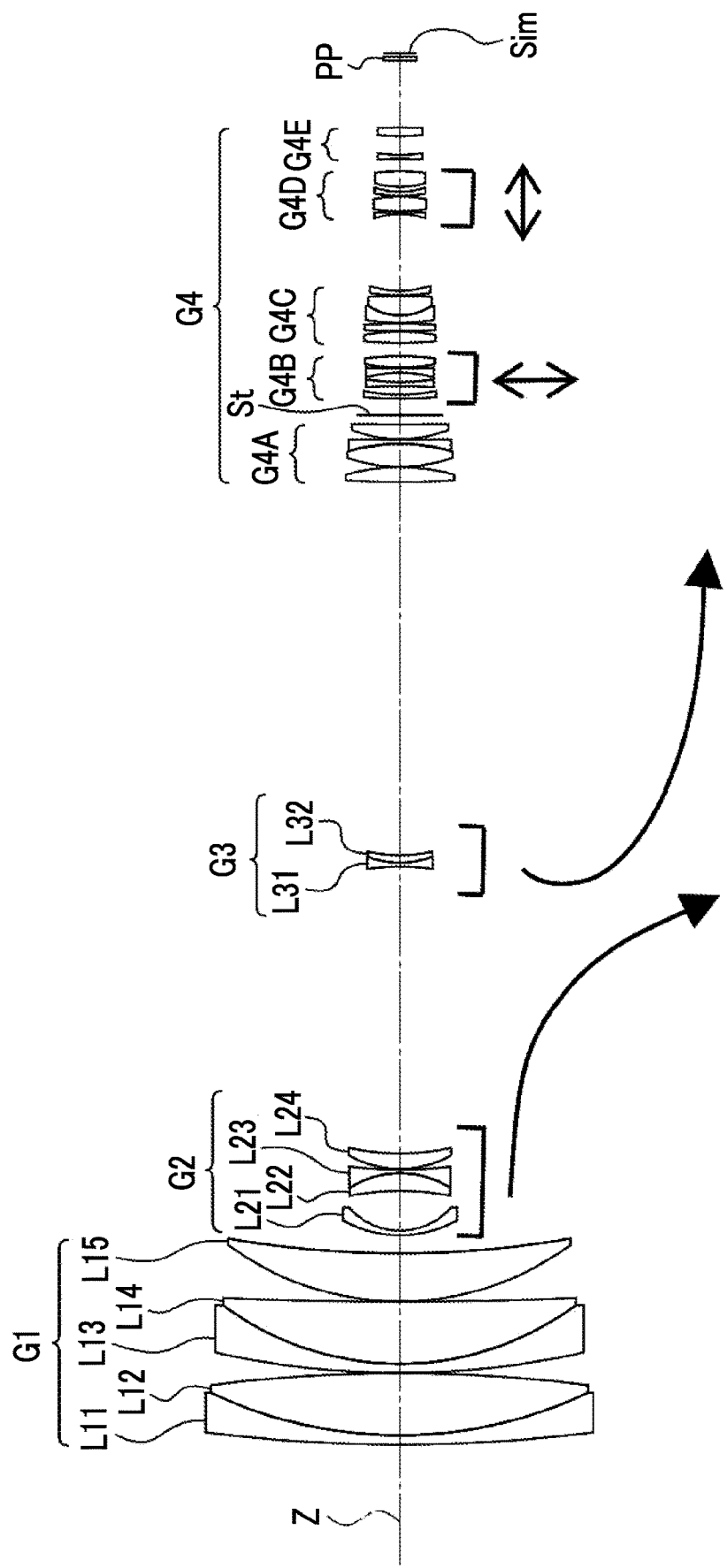
FIG. 1 is a diagram showing a cross-sectional view of a configuration of a zoom lens according to an embodiment of the present disclosure and a movement locus corresponding to a zoom lens of Example 1 of the present disclosure.
Figure 2:
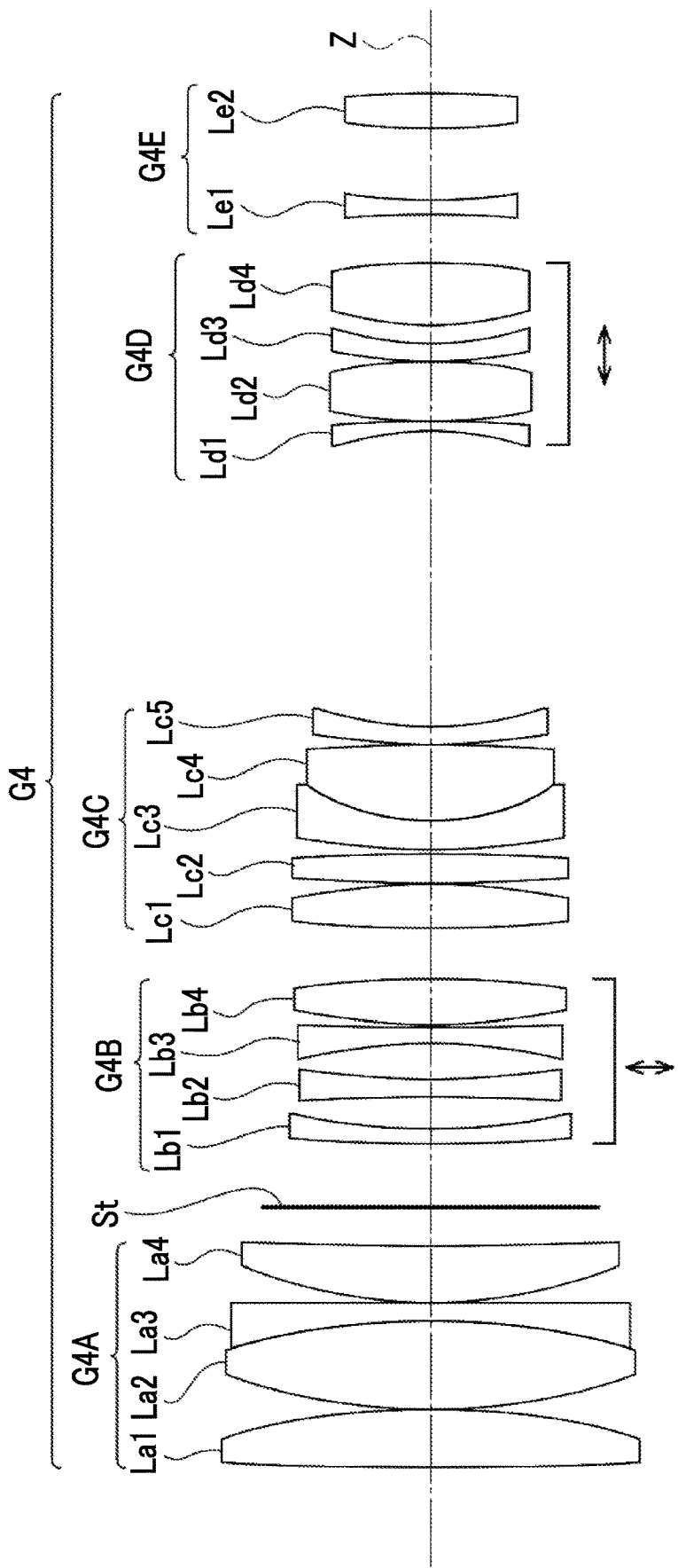
FIG. 2 is a cross-sectional view showing a configuration of a fourth lens group of the zoom lens shown in FIG. 1.

Hereinafter, embodiments of the zoom lens of the present disclosure will be described in detail with reference to the drawings. FIG. 1 shows a cross-sectional view of a configuration and movement loci of a zoom lens at the wide-angle end according to an embodiment of the present disclosure. FIG. 2 is a partially enlarged view of the zoom lens. FIG. 3 is a cross-sectional view showing the lens configuration and the rays in each zoom state of the zoom lens. The examples shown in FIGS. 1 to 3 correspond to the zoom lens of Example 1 to be described later. FIGS. 1 to 3 show situations where an object at infinity is in focus, the left side thereof is an object side, and the right side thereof is an image side. In FIG. 3, the upper part labeled by "WIDE" shows the wide-angle end state, the middle part labeled by "MIDDLE" shows the middle focal length state, and the lower part labeled by "TELE" shows the telephoto end state. FIG. 3 shows rays including on-axis rays wa and rays with the maximum angle of view wb at the wide-angle end state, on-axis rays ma and rays with the maximum angle of view mb at the middle focal length state, and on-axis rays ta and rays with the maximum angle of view tb at the telephoto end state.

FIGS. 1 and 3 show an example in which, assuming that a zoom lens is applied to an imaging apparatus, an optical member PP having a parallel plate shape is disposed between the zoom lens and the image plane Sim. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted in the present disclosure.

The zoom lens of the present disclosure consists of, in order from the object side to the image side along the optical axis Z, a first lens group G1 that has a positive refractive power, a second lens group G2 that has a negative refractive power, a third lens group G3 that has a negative refractive power, and a fourth lens group G4 that has a positive refractive power. An aperture stop St is disposed on the image side from a surface closest to the image side in the third lens group G3. Further, the aperture stop St shown in each of FIGS. 1 to 3 does not show its shape but shows its position in the direction of the optical axis. During zooming from the wide-angle end to the telephoto end, the second lens group G2 constantly moves to the image side, the third lens group G3 moves to the image side after moving to the object side, and the first lens group G1 and the aperture stop St remain stationary with respect to the image plane Sim. In FIG. 1, under the second lens group G2 and the third lens group G3, movement loci of the lens groups during zooming from the wide-angle end to the telephoto end are schematically indicated by arrows.

Further, the first lens group G1, which is closest to the object side, is configured to remain stationary during zooming. In such a configuration, the total optical length does not change during zooming, and it is possible to reduce fluctuation in barycenter of the lens system. Thus, it is possible to improve the convenience at the time of imaging. The total optical length is a sum of a back focal length as an air conversion distance and a distance on the optical axis from the lens surface closest to the object side to a lens surface closest to the image side.

It is possible to take loci of the third lens group G3 moving to the image side in the vicinity of the telephoto end during zooming from the wide-angle end to the telephoto end by forming both the second lens group G2 and the third lens group G3, which are movable during zooming, as a lens group having a negative refractive power. Therefore, since the moving range of the second lens group G2 during zooming can be enlarged without increasing the total optical length, there is an advantage in reducing the total optical length while increasing the zoom ratio. Further, since the moving range of the second lens group G2 can be enlarged, the refractive power of the second lens group G2 can be prevented, and whereby aberration fluctuation accompanying zooming, particularly distortion aberration fluctuation and lateral chromatic aberration fluctuation can be suppressed.

The configuration of the present disclosure in which the second lens group G2 and the third lens group G3 are each formed as a lens group having a negative refractive power can prevent the refractive power of the second lens group G2 also from a reason that the negative refractive power can be shared by the two groups. For this reason, the configuration of the present disclosure can reduce the height of on-axis marginal rays passing through the third lens group G3, compared with a configuration in which the second lens group G2 has a negative refractive power and the third lens group G3 has a positive refractive power. Therefore, there is an advantage in reducing the diameter of the third lens group G3. Further, since the refractive power of the second lens group G2 can be prevented, a configuration in which the positive, negative, negative, and positive lens groups are disposed in order from the object side to the image side easily suppresses distortion at the wide-angle end in a case where the angle is widened. As a result, it may also be applied to a wide-angle zoom lens.

In the example shown in FIG. 1, the first lens group G1 consists of five lenses L11 to L15 in order from the object side to the image side, and the second lens group G2 consists of four lenses L21 to L24 in order from the object side to the image side, the third lens group G3 consists of two lenses L31 and L32 in order from the object side to the image side, and the fourth lens group G4 consists of nineteen lenses. However, in the zoom lens of the present disclosure, the number of lenses composing each lens group may be different from that in the example shown in FIG. 1.

Since the zoom lens of the present disclosure has a great advantage in the fourth lens group G4, the fourth lens group G4 will be described in detail first. The fourth lens group G4 includes only five lens groups, as lens groups, which consists of, in order from the object side to the image side, a fourth A lens group G4A which has a positive refractive power, a fourth B lens group G4B which has a negative refractive power and which moves in a direction intersecting with an optical axis Z during image blur correction, a fourth C lens group G4C which has a positive refractive power, a fourth D lens group G4D which moves along the optical axis Z during focusing, and a fourth E lens group G4E. The fourth D lens group G4D and the fourth E lens group G4E have refractive powers having different signs from each other. During zooming, the fourth A lens group G4A, the fourth B lens group G4B, the fourth C lens group G4C, and the fourth E lens group G4E remain stationary with respect to the image plane Sim.

FIG. 2 is an enlarged view of the fourth lens group G4 of the zoom lens of FIG. 1. In the example shown in FIG. 2, the fourth A lens group G4A consists of four lenses Lal to La4 in order from the object side to the image side, the fourth B lens group G4B consists of four lenses Lb1 to Lb4 in order from the object side to the image side, the fourth C lens group G4C consists of five lenses Lc1 to Lc5 in order from the object side to the image side, the fourth D lens group G4D consists of four lenses Ld1 to Ld4 in order from the object side to the image side, and the fourth E lens group G4E consists of two lenses Le1 and Le2 in order from the object side to the image side. The aperture stop St is disposed between the fourth A lens group G4A and the fourth B lens group G4B. However, in the zoom lens of the present disclosure, the number of lenses composing each lens group in the fourth lens group G4 may be different from that in the example shown in FIG. 2, and the aperture stop St may be disposed at a position different from that in the example shown in FIG. 2.

The rays diverged through the second lens group G2 and the third lens group G3 can be converged and incident on the fourth B lens group G4B by forming the fourth A lens group G4A as a lens group having a positive refractive power. Therefore, the lenses of the fourth B lens group G4B can be reduced in diameter.

The fourth A lens group G4A consists of, in order from the object side to the image side, a single lens having a positive refractive power, a cemented lens having a positive refractive power as a whole, and a single lens having a positive refractive power, and the cemented lens is preferably formed by cementing a biconvex lens and a negative lens in order from the object side. In such a case, divergent light from the third lens group G3 is incident on the single lens which has a positive refractive power and is closest to the object side in the fourth A lens group G4A, so that it becomes possible to correct spherical aberration that tends to be over at the wide-angle side, which increases in the second lens group G2 and the third lens group G3. The cemented surface of the cemented lens has a shape convex toward the image side, and by the cemented lens having the cemented surface of this shape, longitudinal chromatic aberration can be satisfactorily corrected using high-order spherical aberration that occurs for each wavelength. Further, by disposing a single lens having a positive refractive power on the image side of the cemented lens, it becomes easy for the negative lens in the cemented lens to secure a negative refractive power necessary for correcting the longitudinal chromatic aberration. As a result, it is possible to obtain favorable optical performance.

The fourth B lens group G4B moves in the direction intersecting with the optical axis Z so as to be able to displace the image position in the direction perpendicular to the optical axis Z, whereby image blur correction can be performed. In the zoom lens of the present disclosure, the fourth A lens group G4A and the fourth C lens group G4C, which are lens groups on both sides of the fourth B lens group G4B, remain stationary with respect to the image plane Sim during image blur correction. In the example shown in FIG. 1, the vibration reduction lens group consists of only the fourth B lens group G4B, and the lens groups other than the fourth B lens group G4B remain stationary with respect to the image plane Sim during image blur correction. The vertical double-headed arrow noted below the fourth B lens group G4B in FIG. 1 indicates that the fourth B lens group G4B is a vibration reduction lens group.

By forming the fourth B lens group G4B as a lens group having a negative refractive power, it is possible to increase the refractive power of the fourth B lens group G4B. Thus, there is an advantage in obtaining a large vibration reduction angle even in a case where the amount of movement of the fourth B lens group G4B is reduced during image blur correction. Here, the vibration reduction angle is an image blur correction angle that can be corrected by moving the vibration reduction lens group. Further, by making the refractive power of the fourth B lens group G4B negative, even in a case where the refractive power of the fourth B lens group G4B is increased in order to obtain a large vibration reduction angle by moving the fourth B lens group G4B by a small amount, it is possible to suppress an increase in the diameter of the rays passing through the fourth B lens group G4B. As a result, it is possible to achieve a reduction in diameter of the fourth B lens group G4B. If the refractive power of the fourth B lens group G4B is made positive, it is necessary to increase the ray diameter in advance in consideration of the effect of converging the rays, and it is necessary to ensure the height from the optical axis Z of the off-axis rays to achieve the image size. As a result, it is difficult to reduce the diameter of the fourth B lens group G4B.

The fourth B lens group G4B consists of three single lenses each of which has a negative refractive power and one positive lens, and it is preferable that two single lenses among the three single lenses each of which has a negative refractive power are successively disposed in order from a position closest to the object side in the fourth B lens group G4B. Thus, by disposing two negative lenses having a diverging effect on the object side in the fourth B lens group G4B, it is possible to suppress the occurrence of high-order spherical aberration in the fourth B lens group G4B. Further, by disposing a single lens having a negative refractive power and a single lens having a positive refractive power on the image side of these two negative lenses, it is possible to suppress chromatic aberration fluctuation accompanying movement of the fourth B lens group G4B during image blur correction.

The fourth C lens group G4C is a lens group having a positive refractive power. The rays that have received a diverging effect through the fourth B lens group G4B can receive a convergence effect through the fourth C lens group G4C disposed on the image side of the fourth B lens group G4B. As a result, it is possible to suppress an increase in diameter of the rays incident on the fourth D lens group G4D.

The fourth D lens group G4D moves along the optical axis Z so as to perform focusing. In the zoom lens of the present disclosure, the focusing lens group consists of only the fourth D lens group G4D, and the lens groups other than the fourth D lens group G4D remain stationary with respect to the image plane Sim during focusing. Therefore, in the zoom lens of the present disclosure, the lens of the first lens group G1 which has large lens diameter and is easily increased in weight is not used for focusing, and thus there is an advantage in achieving an increase in speed of autofocus, and also there is an advantage in surveillance camera applications that require durability of a focusing mechanism. The horizontal double-headed arrow noted below the fourth D lens group G4D in FIG. 1 indicates that the fourth D lens group G4D is a focusing lens group.

The number of lenses composing the fourth D lens group G4D is preferably four or less. In such a case, an increase in weight of the focusing lens group can be suppressed, which is advantageous in an increase in speed of autofocus. The fourth D lens group G4D may be configured to consist of, for example, two negative lenses and two positive lenses. In such a case, it becomes easy to suppress aberration fluctuation during focusing. Specifically, the fourth D lens group G4D may be configured to consist of, in order from the object side to the image side, a negative lens, a positive lens, a negative lens, and a positive lens.

The fourth D lens group G4D which is a focusing lens group is disposed on the image side of the fourth C lens group G4C, and the fourth E lens group G4E which has a refractive power with a sign different from that of a refractive power of the fourth D lens group G4D is disposed on the image side of the fourth D lens group G4D. With this configuration, it is possible to increase the refractive power of the fourth D lens group G4D and reduce the amount of movement of the fourth D lens group G4D during focusing. Further, the refractive power of the fourth D lens group G4D is increased in order to reduce the amount of movement of the fourth D lens group G4D during focusing, whereby the amount of aberration that occurs in the fourth D lens group G4D is increased. Even in this case, it is possible to correct aberration by the fourth E lens group G4E having a refractive power with a sign different from that of a refractive power of the fourth D lens group G4D.

Regarding distribution of the refractive power in the fourth lens group G4, assuming that the composite focal length of the fourth A lens group G4A, the fourth B lens group G4B, and the fourth C lens group G4C is f4ABC and the focal length of the fourth D lens group G4D is f4D, the zoom lens of the present disclosure is configured to satisfy Conditional Expression (1).

$$0.5 < |f4ABC/f4D| < 3 \tag{1}$$

The effect of Conditional Expression (1) will be described according to the sign of the refractive power of the fourth D lens group G4D. In a case where the fourth D lens group G4D has a negative refractive power, the refractive power of the fourth D lens group G4D is prevented from becoming excessively weak by not allowing the result of Conditional Expression (1) to be equal to or less than the lower limit. As a result, it is possible to reduce the amount of movement of the fourth D lens group G4D during focusing. In a case where the fourth D lens group G4D has a negative refractive power, the refractive power of the fourth D lens group G4D is prevented from becoming excessively strong by not allowing the result of Conditional Expression (1) to be equal to or greater than the upper limit. As a result, it is possible to suppress fluctuations of various aberrations during focusing.

In a case where the fourth D lens group G4D has a positive refractive power, it is possible to reduce the amount of movement of the fourth D lens group G4D during focusing while securing an appropriate back focal length by not allowing the result of Conditional Expression (1) to be equal to or less than the lower limit. This is based on a reason described below. If the fourth D lens group G4D has a positive refractive power and the result of Conditional Expression (1) is equal to or less than the lower limit, a composite refractive power of the fourth A lens group G4A, the fourth B lens group G4B, and the fourth C lens group G4C becomes strong, and the divergent light from the third lens group G3 is largely turned into convergent light in the three lens groups. In a case where an appropriate back focal length is to be secured in this state, the positive refractive power of the fourth D lens group G4D cannot be increased, and this leads to an increase in amount of movement of the fourth D lens group G4D during focusing. In a case where the fourth D lens group G4D has a positive refractive power, the refractive power of the fourth D lens group G4D is prevented from becoming excessively strong by not allowing the result of Conditional Expression (1) to be equal to or greater than the upper limit. As a result, it is possible to suppress fluctuations of various aberrations during focusing.

In a case of a configuration of satisfying Conditional Expression (1-1) within a range in which Conditional Expression (1) is satisfied, it is possible to obtain more favorable characteristics.

$$0.8 < |f4ABC/f4D| < 1.5 \tag{1-1}$$

Further, assuming that the lateral magnification of the fourth B lens group G4B at the telephoto end in a state where an object at infinity is in focus is $\beta 4B$, and the composite lateral magnification of the fourth C lens group G4C, the fourth D lens group G4D, and the fourth E lens group G4E at the telephoto end in a state where the object at infinity is in focus is $\beta 4CDE$, it is preferable to satisfy Conditional Expression (3). By not allowing the result of Conditional Expression (3) to be equal to or less than the lower limit, it is possible to suppress coma aberration that occurs during image blur correction. By not allowing the result of Conditional Expression (3) to be equal to or greater than the upper limit, it is possible to reduce the amount of movement of the fourth B lens group G4B necessary during image blur correction, and thereby, it becomes easy to secure the peripheral light amount during image blur correction. In addition, in a case of a configuration in which Conditional Expression (3-1) is satisfied, it is possible to obtain more favorable characteristics.

$$-5 < (1-\beta 4B) \times \beta 4CDE < -1 \tag{3}$$

$$-4 < (1-\beta 4B) \times \beta 4CDE < -1.5 \tag{3-1}$$

Assuming that the lateral magnification of the fourth D lens group G4D at the telephoto end in a state where an object at infinity is in focus is β4D, and the lateral magnification of the fourth E lens group G4E at the telephoto end in a state where the object at infinity is in focus is β4E, it is preferable to satisfy Conditional Expression (4). By not allowing the result of Conditional Expression (4) to be equal to or less than the lower limit, it is possible to suppress an increase in amount of movement of the fourth D lens group G4D during focusing. This is advantageous in realizing a rear focus type. By not allowing the result of Conditional Expression (4) to be equal to or greater than the upper limit, the refractive power of the fourth D lens group G4D is prevented from becoming excessively strong. As a result, it is possible to suppress fluctuations of various aberrations during focusing. Further, in a case where the fourth D lens group G4D has a negative refractive power, it is possible to exhibit the effect that it becomes easy to satisfactorily correct field curvature by not allowing the result of Conditional Expression (4) to be equal to or greater than the upper limit. In addition, in a case of a configuration in which Conditional Expression (4-1) is satisfied, it is possible to obtain more favorable characteristics.

$$0.5 < |(1-\beta 4D^2) \times \beta 4E^2| < 4 \quad (4)$$

$$1.5 < |(1-\beta 4D^2) \times \beta 4E^2| < 2.8 \quad (4\text{-}1)$$

The fourth D lens group G4D may have a negative refractive power, and the fourth E lens group G4E may have a positive refractive power. In such a case, it is possible to give a converging effect to the rays bounced through the fourth D lens group G4D by the fourth E lens group G4E having a positive refractive power. Therefore, it is possible to suppress an increase in incident angle of the principal rays of the off-axis rays on the image plane Sim.

In a configuration in which the fourth D lens group G4D has a negative refractive power, assuming that the composite focal length of the fourth A lens group G4A, the fourth B lens group G4B, and the fourth C lens group G4C is f4ABC and the focal length of the fourth D lens group G4D is f4D, it is preferable to satisfy Conditional Expression (5). By not allowing the result of Conditional Expression (5) to be equal to or less than the lower limit, the refractive power of the fourth D lens group G4D is prevented from becoming excessively strong. As a result, it is possible to satisfactorily correct field curvature. By not allowing the result of Conditional Expression (5) to be equal to or greater than the upper limit, the refractive power of the fourth D lens group G4D is prevented from becoming excessively weak. As a result, it is possible to suppress the amount of movement of the fourth D lens group G4D necessary for focusing. Further, by making the range of f4ABC/f4D negative so as to satisfy Conditional Expression (5) and making the refractive power of the fourth D lens group G4D negative, the rays bounced through the fourth D lens group G4D are given a converging effect by the fourth E lens group G4E, and it becomes easy to make the rays incident at an appropriate angle with respect to the image plane Sim. For this reason, Conditional Expression (5) is a preferable condition in a case where the image size needs to be increased to perform electronic vibration reduction. In addition, in a case of a configuration in which Conditional Expression (5-1) is satisfied, it is possible to obtain more favorable characteristics.

$$-3 < f4ABC/f4D < -0.6 \quad (5)$$

$$-1.4 < f4ABC/f4D < -0.7 \quad (5\text{-}1)$$

The aperture stop St is preferably disposed between the fourth A lens group G4A and the fourth B lens group G4B. In a configuration in which the second lens group G2 and the third lens group G3, which are movable during zooming, are formed as a lens group having a negative refractive power, an interval between the third lens group G3 and the fourth lens group G4 during zooming is minimum at the telephoto end. If the aperture stop St is disposed to be adjacent to the fourth A lens group G4A on the object side of the fourth A lens group G4A, it is necessary to provide intervals for avoiding an interference between the third lens group G3 and the aperture stop St and an interference between the aperture stop St and the fourth A lens group G4A. On the other hand, by disposing the aperture stop St not on the object side of the fourth A lens group G4A but on the image side of the fourth A lens group G4A, it is not necessary to provide the intervals described above, which contributes to increasing the zoom ratio. Further, the rays diverged through the second lens group G2 and the third lens group G3 can pass through the aperture stop St after being converged through the fourth A lens group G4A. Therefore, it is possible to suppress an increase in diameter of the aperture stop St. In addition, in a case where the aperture stop St is disposed extremely on the image side, the peripheral light amount is reduced.

Next, preferred configurations and possible configurations of the first lens group G1, the second lens group G2, and the third lens group G3 will be described. For example, the first lens group G1 can be configured to consist of, in order from the object side to the image side, a cemented lens in which a negative meniscus lens and a biconvex lens are cemented, a cemented lens in which a negative meniscus lens and a positive meniscus lens are cemented, and a positive meniscus lens. Alternatively, the first lens group G1 can be configured to consist of, in order from the object side to the image side, a cemented lens in which a negative meniscus lens and a biconvex lens are cemented and a cemented lens in which a biconvex lens and a biconcave lens are cemented.

The second lens group G2 preferably includes a cemented lens. In that case, it is preferable that the cemented lens of the second lens group G2 is formed by cementing a positive lens and a negative lens in order from the object side and has a cemented surface concave toward the object side. By forming the cemented surface in such a shape, it is possible to satisfactorily correct longitudinal chromatic aberration that occurs in the first lens group G1 on the telephoto side.

For example, the second lens group G2 can be configured to consist of, in order from the object side to the image side, a negative meniscus lens, a cemented lens in which a positive meniscus lens and a biconcave lens are cemented, and a positive meniscus lens. Alternatively, the second lens group G2 can be configured to consist of, in order from the object side to the image side, a biconvex lens, a negative meniscus lens, a biconcave lens, and a cemented lens in which a positive meniscus lens and a biconcave lens are cemented.

Assuming that the focal length of the second lens group G2 is f2, and the focal length of the third lens group G3 is f3, it is preferable to satisfy Conditional Expression (2). By not allowing the result of Conditional Expression (2) to be equal to or less than the lower limit, the refractive power of the second lens group G2 is prevented from becoming excessively strong. As a result, it is possible to suppress overcorrection of spherical aberration on the telephoto side, which is advantageous in obtaining high optical performance. By not allowing the result of Conditional Expression (2) to be equal to or greater than the upper limit, the refractive power of the second lens group G2 is prevented from becoming excessively weak. As a result, the amount of movement of the second lens group G2 during zooming can be easily shortened, which is advantageous in shortening the total optical length. In addition, in a case of a configuration in which Conditional Expression (2-1) is satisfied, it is possible to obtain more favorable characteristics.

$$0.4 < f2/f3 < 1.5 \quad (2)$$

$$0.5 < f2/f3 < 0.9 \quad (2\text{-}1)$$

For example, the third lens group G3 can be configured to consist of a cemented lens in which a biconcave lens and a positive meniscus lens are cemented in order from the object side to the image side.

In the example shown in FIG. 1, the optical member PP is disposed between the zoom lens and the image plane Sim. However, in a case where the optical member PP is the infrared cut filter and a filter that cuts a specific wavelength range of visible light, the optical member PP can be disposed at any position in the optical path. For example, the filter may be disposed to be adjacent to the fourth E lens group G4E on the object side or the image side of the fourth E lens group G4E.

The above-mentioned preferred configurations and available configurations may be optional combinations, and it is preferable to selectively adopt the configurations in accordance with required specification. According to the technology of the present disclosure, it is possible to realize a zoom lens that is capable of reducing the size thereof while achieving an increase in focal length on the telephoto side and that comprises a vibration reduction lens group and a focusing lens group having a small diameter so as to have favorable optical performance. Here, the phrase "an increase in focal length on the telephoto side" means that the focal length at the telephoto end is equal to or greater than 500 mm.

Next, numerical examples of the zoom lens of the present disclosure will be described.

Example 1

FIG. 1 shows a configuration and movement loci of a zoom lens of Example 1, and an illustration method and a configuration thereof is as described above. Therefore, repeated description is partially omitted herein. The zoom lens of Example 1 consists of, in order from the object side to the image side, a first lens group G1 that has a positive refractive power, a second lens group G2 that has a negative refractive power, a third lens group G3 that has a negative refractive power, and a fourth lens group G4 that has a positive refractive power. The first lens group G1 consists of five lenses L11 to L15 in order from the object side to the image side, and the second lens group G2 consists of four lenses L21 to L24 in order from the object side to the image side, the third lens group G3 consists of two lenses L31 and L32 in order from the object side to the image side. The fourth lens group G4 consists of, in order from the object side to the image side, a fourth A lens group G4A which has a positive refractive power, an aperture stop St, a fourth B lens group G4B which has a negative refractive power, a fourth C lens group G4C which has a positive refractive power, a fourth D lens group G4D which has a positive refractive power, and a fourth E lens group G4E which has a negative refractive power. During zooming from the wide-angle end to the telephoto end, the second lens group G2 constantly moves to the image side, the third lens group G3 moves to the image side after moving to the object side, and the first lens group G1, the fourth A lens group G4A, the fourth B lens group G4B, the fourth C lens group G4C, and the fourth E lens group G4E remain stationary with respect to the image plane Sim. The fourth D lens group G4D remains stationary with respect to the image plane Sim during zooming in a state where an object at infinity is in focus, and moves during zooming in a state where the object at a finite distance is in focus. The vibration reduction lens group consists of only the fourth B lens group G4B. The focusing lens group consists of only the fourth D lens group G4D. The outline of the zoom lens of Example 1 has been described above.

Regarding the zoom lens of Example 1, Tables 1A and 1B show basic lens data thereof, and Table 2 shows specification and variable surface distances thereof. Here, the basic lens data is displayed to be divided into two tables of Table 1A and Table 1B in order to prevent one table from becoming long. Table 1A shows the first lens group G1, the second lens group G2, and the third lens group G3, and Table 1B shows the fourth lens group G4 and the optical member PP. In Table 1B, the rightmost column is divided into groups of the fourth A lens group G4A to the fourth E lens group G4E, where G4A to G4E which are signs of the respective groups are shown. Tables 1A, 1B, and 2 show data in a state where an object at infinity is in focus.

In Tables 1A and 1B, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. The column of Nd shows a refractive index of each constituent element at the d line, and the column of vd shows an Abbe number of each constituent element at the d line. In the present example, a light shielding member (not shown) having a circular opening centered on a point on the optical axis is disposed on a predetermined plane to limit the height of the rays that can pass therethrough. The column of ApD in Table 1A shows diameter of the opening in a row of the plane on which the light shielding member is disposed.

In Tables 1A and 1B, the sign of the radius of curvature of the surface convex toward the object side is positive and the sign of the radius of curvature of the surface convex toward the image side is negative. In Table 1B, in a place of a surface number of a surface corresponding to the aperture stop St, the surface number and a term of (St) are noted. In Tables 1A and 1B, the variable surface distances during zooming are referenced by the reference signs DD[ ], and are written into places of D, where object side surface numbers of distances are noted in [ ].

In Table 2, values of the zoom ratio Zr, the focal length f, the back focal length Bf in terms of the air conversion distance, the F number FNo., the maximum total angle of view 2ω, and variable surface distance during zooming are based on the d line. (°) in the place of 2ω indicates that the unit thereof is a degree. In Table 2, values in the wide-angle end state, the middle focal length state, and the telephoto end state are respectively shown in the columns labeled by WIDE, MIDDLE, and TELE.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1A

Example 1

| Sn | R | D | Nd | vd | ApD |
|---|---|---|---|---|---|
| 1 | 436.11535 | 2.520 | 1.51823 | 58.96 | 108.00 |
| 2 | 124.19279 | 16.898 | 1.49700 | 81.54 | |
| 3 | −436.25910 | 0.100 | | | |
| 4 | 237.32903 | 2.500 | 1.77250 | 49.60 | |
| 5 | 83.72232 | 16.885 | 1.49700 | 81.54 | |
| 6 | 1183.62272 | 0.100 | | | |
| 7 | 82.36512 | 12.915 | 1.49700 | 81.54 | |
| 8 | 284.79280 | DD[8] | | | 94.33 |
| 9 | 34.22789 | 1.200 | 1.67300 | 38.26 | |
| 10 | 19.47378 | 10.844 | | | |
| 11 | −72.83144 | 4.785 | 1.80518 | 25.42 | |
| 12 | −27.19415 | 1.010 | 1.72916 | 54.68 | |
| 13 | 119.72453 | 0.200 | | | |
| 14 | 30.15117 | 4.196 | 1.49700 | 81.61 | |
| 15 | 67.31973 | DD[15] | | | |
| 16 | −64.32497 | 1.010 | 1.49700 | 81.61 | |
| 17 | 25.80747 | 2.076 | 1.80440 | 39.58 | |
| 18 | 42.46081 | DD[18] | | | 18.00 |

TABLE 1B

Example 1

| Sn | R | D | Nd | vd | |
|---|---|---|---|---|---|
| 19 | 246.63007 | 4.028 | 1.49700 | 81.61 | G4A |
| 20 | −57.78910 | 0.100 | | | |
| 21 | 45.10523 | 6.270 | 1.49700 | 81.61 | |
| 22 | −52.05909 | 1.200 | 1.78800 | 47.37 | |
| 23 | −1461.44796 | 0.100 | | | |
| 24 | 38.14722 | 3.983 | 1.71700 | 47.93 | |
| 25 | 1604.43173 | 2.624 | | | |
| 26(St) | ∞ | 4.393 | | | |
| 27 | 133.43832 | 1.031 | 1.88100 | 40.14 | G4B |
| 28 | 46.75089 | 2.318 | | | |
| 29 | −151.84440 | 1.200 | 1.90043 | 37.37 | |
| 30 | 64.78687 | 2.514 | | | |
| 31 | −38.78827 | 1.200 | 1.90043 | 37.37 | |
| 32 | 251.64410 | 0.255 | | | |
| 33 | 58.08173 | 3.027 | 1.49700 | 81.61 | |
| 34 | −81.08090 | 3.649 | | | |
| 35 | 111.16790 | 3.029 | 1.51742 | 52.15 | G4C |
| 36 | −57.14740 | 0.100 | | | |
| 37 | 126.69770 | 2.028 | 1.90366 | 31.31 | |
| 38 | −253.05051 | 0.336 | | | |
| 39 | 60.28116 | 2.000 | 1.91082 | 35.25 | |
| 40 | 16.16620 | 5.321 | 1.62004 | 36.26 | |
| 41 | −198.63416 | 0.109 | | | |
| 42 | 51.74418 | 1.200 | 1.77250 | 49.60 | |
| 43 | 25.46098 | 20.827 | | | |
| 44 | −21.27955 | 0.600 | 1.60300 | 65.44 | G4D |
| 45 | −99.89665 | 0.100 | | | |
| 46 | 42.90482 | 4.051 | 1.51823 | 58.96 | |
| 47 | −39.02365 | 0.100 | | | |
| 48 | 37.48681 | 1.200 | 1.90366 | 31.31 | |
| 49 | 21.86902 | 1.349 | | | |
| 50 | 25.86405 | 4.202 | 1.51680 | 64.20 | |
| 51 | −54.83159 | 3.469 | | | |
| 52 | −79.24844 | 1.000 | 1.88100 | 40.14 | G4E |
| 53 | 40.95584 | 5.132 | | | |
| 54 | 60.65549 | 2.257 | 1.92286 | 20.88 | |
| 55 | −246.60843 | 18.332 | | | |
| 56 | ∞ | 1.000 | 1.51633 | 64.14 | |
| 57 | ∞ | | | | |

TABLE 2

Example 1

| | WIDE | MIDDLE | TELE |
|---|---|---|---|
| Zr | 1.0 | 19.9 | 38.8 |
| f | 20.018 | 398.938 | 775.681 |
| Bf | 19.991 | 19.991 | 19.991 |
| FNo. | 3.94 | 4.42 | 7.44 |
| 2ω(°) | 25.0 | 1.2 | 0.6 |
| DD[8] | 4.989 | 104.308 | 105.234 |
| DD[15] | 77.960 | 33.621 | 73.916 |
| DD[18] | 101.048 | 46.068 | 4.846 |

FIGS. 8 and 9 each show aberration diagrams in a state where an object at infinity is brought into focus through the zoom lens of Example 1. FIG. 8 shows aberration diagrams in a state where there is no image blurring. In FIG. 8, in order from the left side, spherical aberration, astigmatism, distortion, and lateral chromatic aberration are shown. In FIG. 8, the upper part labeled by "WIDE" shows aberrations in the wide-angle end state, the middle part labeled by "MIDDLE" shows aberrations in the middle focal length state, the lower part labeled by "TELE" shows aberrations in the telephoto end state. In the spherical aberration diagram, aberrations at the d line, the C line, the F line, and the g line are indicated by the solid line, the long dashed line, the short dashed line, and the chain line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the chain line. In the spherical aberration diagram, FNo. indicates an F number. In the other aberration diagrams, w indicates a half angle of view.

FIG. 9 shows lateral aberrations at the telephoto end. In FIG. 9, the upper part labeled by "no optical system tilt" shows aberrations in the state where there is no image blurring. The lower part labeled by "optical system tilt 0.2° correction" shows aberrations in a state where image blur correction is performed by moving the vibration reduction lens group in a direction perpendicular to the optical axis Z in a case where there is image blurring caused by the optical system tilt of 0.2°. In FIG. 9, the left column labeled by "T" shows aberrations in the tangential direction, and the right column labeled by "S" shows aberrations in the sagittal direction. Y in FIG. 9 means the image height. FIG. 9 shows aberrations at Y=3.12 corresponding to 70% of the maximum image height on the positive side, Y=0 corresponding to the image height of 0, and Y=−3.12 corresponding to 70% of the maximum image height on the negative side. In the lateral aberration diagram, aberrations at the d line, the C line, the F line, and the g line are respectively indicated by the solid line, the short dashed line, the long dashed line, and the chain line.

Symbols, meanings, description methods, and illustration methods of the respective data pieces according to Example 1 are the same as those in the following examples unless otherwise noted. Therefore, in the following description, repeated description will be omitted.

Example 2

Figure 4:
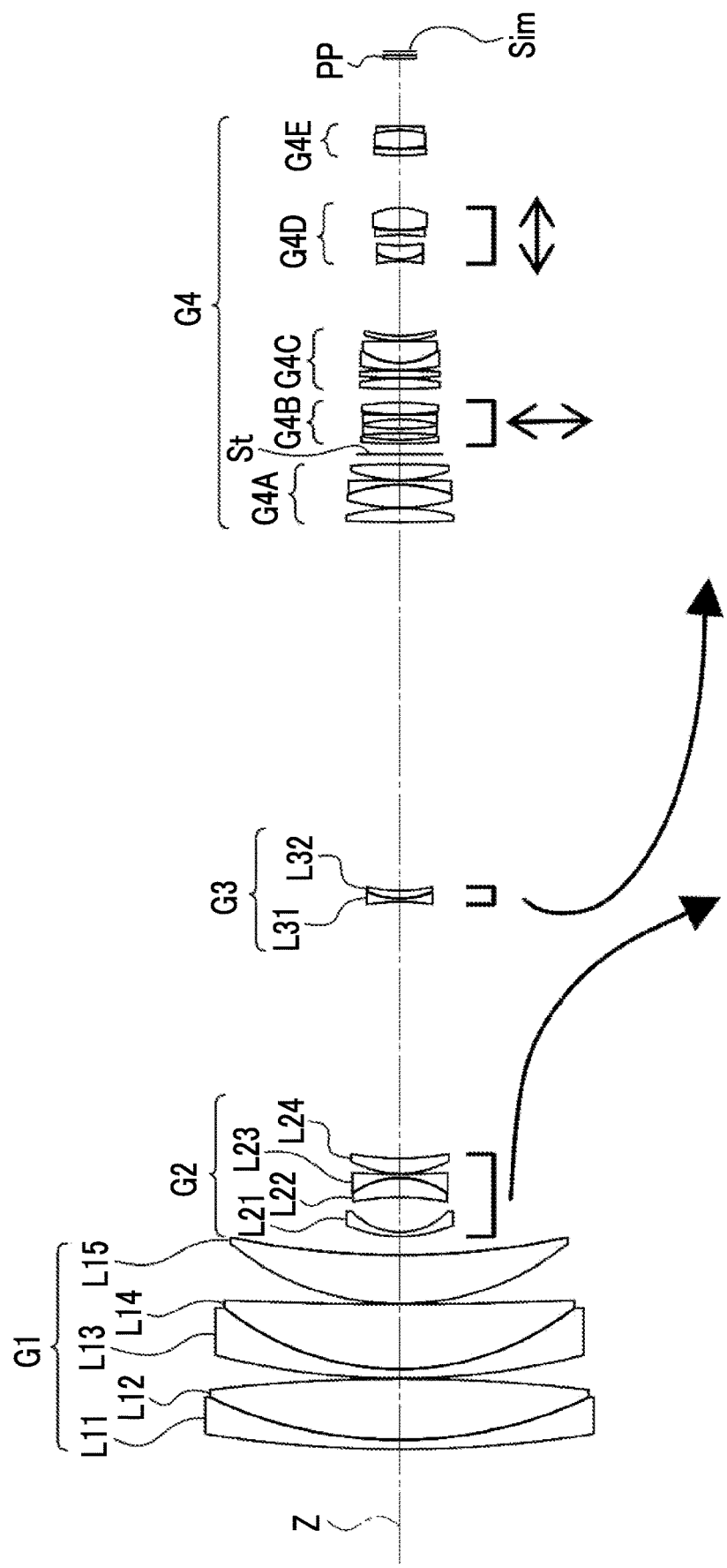
FIG. 4 is a diagram showing a cross-sectional view of a configuration of a zoom lens according to Example 2 of the present disclosure and a movement locus thereof.

FIG. 4 shows a configuration and movement loci of the zoom lens of Example 2. The zoom lens of Example 2 has the same configuration as the zoom lens of Example 1 except that the fourth D lens group G4D has a negative refractive power and the fourth E lens group G4E has a positive refractive power. Regarding the zoom lens of Example 2, Tables 3A and 3B show basic lens data thereof, Table 4 shows specification and variable surface distances thereof, and FIGS. 10 and 11 show aberration diagrams thereof. FIG. 10 shows aberration diagrams in a state where there is no image blurring. In FIG. 11, the upper part labeled by "no optical system tilt" shows aberrations in the state where there is no image blurring. The lower part labeled by "optical system tilt 0.2° correction" shows aberrations in a state where image blur correction is performed by moving the vibration reduction lens group in a direction perpendicular to the optical axis Z in a case where there is image blurring caused by the optical system tilt of 0.2°.

TABLE 3A

Example 2

| Sn | R | D | Nd | vd | ApD |
|---|---|---|---|---|---|
| 1 | 352.97508 | 2.520 | 1.51742 | 52.43 | 108.00 |
| 2 | 125.57257 | 16.587 | 1.49700 | 81.54 | |
| 3 | −458.96009 | 0.100 | | | |
| 4 | 211.18760 | 2.500 | 1.77250 | 49.60 | |
| 5 | 79.24715 | 17.609 | 1.49700 | 81.54 | |
| 6 | 1067.33504 | 0.100 | | | |
| 7 | 76.06251 | 13.115 | 1.49700 | 81.54 | |
| 8 | 232.56635 | DD[8] | | | 92.39 |
| 9 | 38.42859 | 1.200 | 1.67300 | 38.26 | |
| 10 | 18.66690 | 9.373 | | | |
| 11 | −72.32562 | 5.295 | 1.80518 | 25.42 | |
| 12 | −22.88784 | 1.010 | 1.77250 | 49.60 | |
| 13 | 187.22644 | 0.200 | | | |
| 14 | 29.72704 | 4.119 | 1.49700 | 81.61 | |
| 15 | 77.85669 | DD[15] | | | |
| 16 | −66.52911 | 1.010 | 1.49700 | 81.61 | |
| 17 | 24.24403 | 2.070 | 1.85150 | 40.78 | |
| 18 | 37.55704 | DD[18] | | | 18.00 |

TABLE 3B

Example 2

| Sn | R | D | Nd | vd | |
|---|---|---|---|---|---|
| 19 | 279.65110 | 3.927 | 1.49700 | 81.61 | G4A |
| 20 | −56.90170 | 0.100 | | | |
| 21 | 58.79770 | 6.211 | 1.49700 | 81.61 | |
| 22 | −40.71929 | 1.200 | 1.71300 | 53.87 | |
| 23 | −1266.60726 | 0.100 | | | |
| 24 | 41.25278 | 4.297 | 1.67300 | 38.26 | |
| 25 | −222.19999 | 2.681 | | | |
| 26(St) | ∞ | 2.816 | | | |
| 27 | 125.97697 | 1.000 | 1.88300 | 40.80 | G4B |
| 28 | 55.82442 | 1.840 | | | |
| 29 | −134.81359 | 1.200 | 1.91082 | 35.25 | |
| 30 | 68.09809 | 2.565 | | | |
| 31 | −43.50111 | 1.200 | 2.00069 | 25.46 | |
| 32 | 281.21021 | 0.100 | | | |
| 33 | 64.31282 | 3.339 | 1.49700 | 81.61 | |
| 34 | −71.98198 | 3.616 | | | |
| 35 | 209.81860 | 2.884 | 1.49700 | 81.61 | G4C |
| 36 | −65.39696 | 0.100 | | | |
| 37 | 172.57757 | 1.992 | 1.67270 | 32.17 | |
| 38 | −301.33916 | 0.100 | | | |
| 39 | 59.95037 | 2.000 | 1.90366 | 31.31 | |
| 40 | 18.68576 | 5.942 | 1.71736 | 29.52 | |
| 41 | −259.48156 | 0.100 | | | |
| 42 | 35.30280 | 1.269 | 1.49700 | 81.61 | |
| 43 | 34.14784 | 20.000 | | | |
| 44 | −38.75493 | 0.600 | 1.77250 | 49.60 | G4D |
| 45 | 12.60063 | 3.809 | 1.63980 | 34.47 | |

TABLE 3B-continued

Example 2

| Sn | R | D | Nd | vd | |
|---|---|---|---|---|---|
| 46 | 43.73721 | 2.797 | | | |
| 47 | −46.49233 | 1.200 | 1.71300 | 53.87 | |
| 48 | 68.29722 | 0.100 | | | |
| 49 | 32.97782 | 6.000 | 1.51742 | 52.43 | |
| 50 | −19.56250 | 14.118 | | | |
| 51 | 54.57055 | 1.949 | 1.76182 | 26.52 | G4E |
| 52 | 144.29779 | 0.100 | | | |
| 53 | 39.58500 | 4.963 | 1.53775 | 74.70 | |
| 54 | −26.12308 | 1.000 | 1.90366 | 31.31 | |
| 55 | −340.09512 | 18.334 | | | |
| 56 | ∞ | 1.000 | 1.51633 | 64.14 | |
| 57 | ∞ | | | | |

TABLE 4

Example 2

| | WIDE | MIDDLE | TELE |
|---|---|---|---|
| Zr | 1.0 | 19.9 | 38.8 |
| f | 20.018 | 398.952 | 775.708 |
| Bf | 19.989 | 19.989 | 19.989 |
| FNo. | 3.98 | 4.39 | 7.43 |
| 2ω(°) | 24.8 | 1.2 | 0.6 |
| DD[8] | 4.987 | 94.242 | 94.950 |
| DD[15] | 69.279 | 34.484 | 73.710 |
| DD[18] | 99.252 | 44.793 | 4.858 |

Example 3

Figure 5:
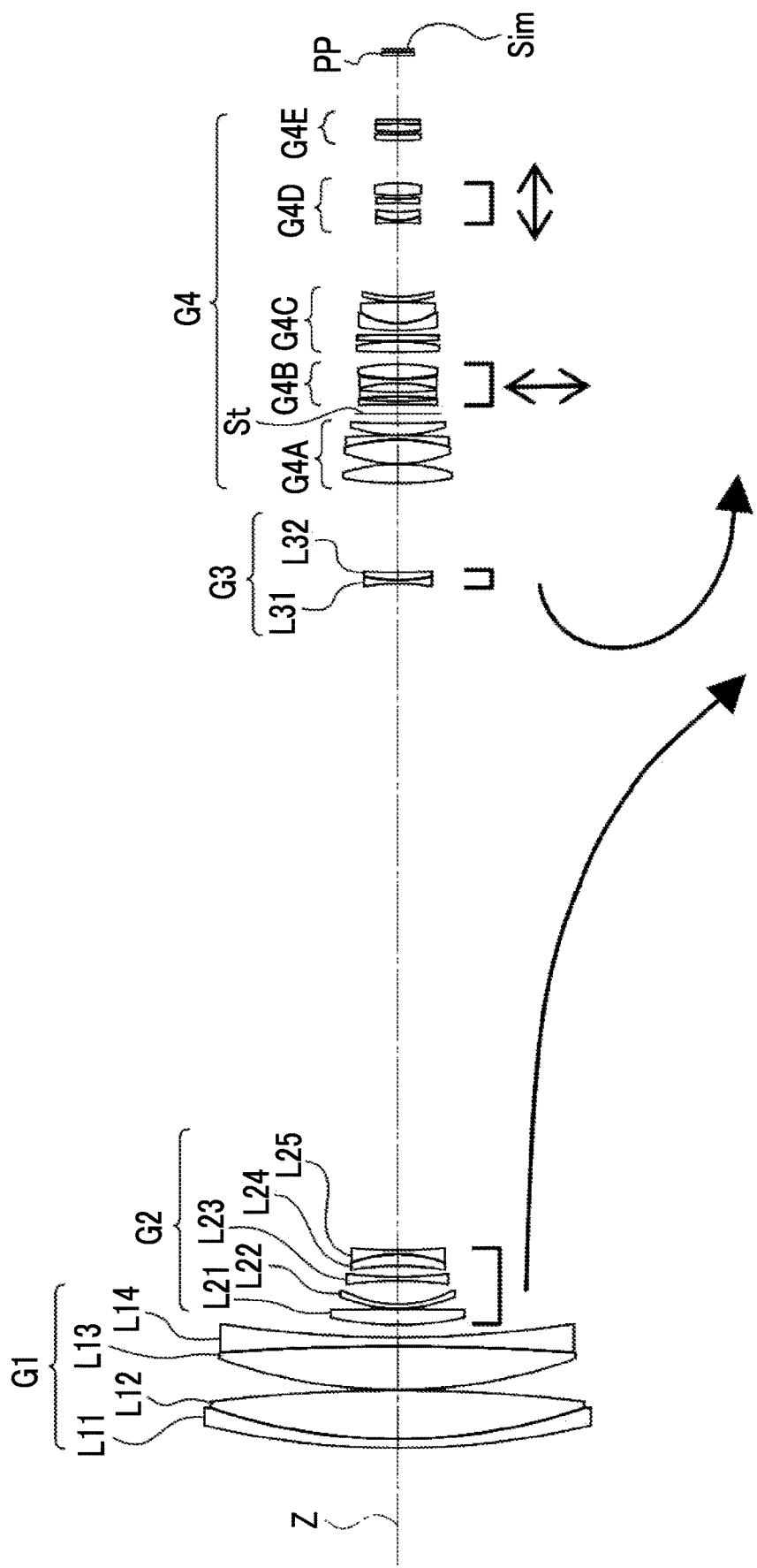
FIG. 5 is a diagram showing a cross-sectional view of a configuration of a zoom lens according to Example 3 of the present disclosure and a movement locus thereof.

FIG. 5 shows a configuration and movement loci of the zoom lens of Example 3. The zoom lens of Example 3 has the same configuration as the outline of the zoom lens of Example 1 except that the first lens group G1 consists of four lenses L11 to L14 in order from the object side to the image side, the second lens group G2 consists of five lenses L21 to L25 in order from the object side to the image side, the fourth D lens group G4D has a negative refractive power, and the fourth E lens group G4E has a positive refractive power. Regarding the zoom lens of Example 3, Tables 5A and 5B show basic lens data thereof, Table 6 shows specification and variable surface distances thereof, and FIGS. 12 and 13 show aberration diagrams thereof. FIG. 12 shows aberration diagrams in a state where there is no image blurring. In FIG. 13, the upper part labeled by "no optical system tilt" shows aberrations in the state where there is no image blurring. The lower part labeled by "optical system tilt 0.2° correction" shows aberrations in a state where image blur correction is performed by moving the vibration reduction lens group in a direction perpendicular to the optical axis Z in a case where there is image blurring caused by the optical system tilt of 0.2°.

TABLE 5A

Example 3

| Sn | R | D | Nd | vd | ApD |
|---|---|---|---|---|---|
| 1 | 238.10302 | 2.520 | 1.53172 | 48.84 | 108.00 |
| 2 | 165.65750 | 13.252 | 1.49700 | 81.61 | |
| 3 | −449.31827 | 0.100 | | | |
| 4 | 148.96253 | 11.878 | 1.49700 | 81.61 | |
| 5 | −735.41486 | 2.500 | 1.83481 | 42.72 | |
| 6 | 332.98889 | DD[6] | | | |

TABLE 5A-continued

Example 3

| Sn | R | D | Nd | vd | ApD |
|---|---|---|---|---|---|
| 7 | 82.64288 | 4.411 | 1.84666 | 23.78 | |
| 8 | −1280.08870 | 0.100 | | | 96.15 |
| 9 | 41.82388 | 1.200 | 1.84666 | 23.78 | |
| 10 | 33.44675 | 6.303 | | | |
| 11 | −113.68126 | 1.200 | 1.71300 | 53.87 | |
| 12 | 120.64504 | 2.903 | | | |
| 13 | −76.81227 | 3.098 | 2.10420 | 17.02 | |
| 14 | −37.01343 | 1.020 | 2.00100 | 29.13 | |
| 15 | 121.23158 | DD[15] | | | |
| 16 | −57.01052 | 1.010 | 1.80400 | 46.58 | |
| 17 | 47.43411 | 2.100 | 1.92119 | 23.96 | |
| 18 | 215.14459 | DD[18] | | | 19.19 |

TABLE 5B

Example 3

| Sn | R | D | Nd | vd | |
|---|---|---|---|---|---|
| 19 | 87.37034 | 5.254 | 1.49700 | 81.61 | G4A |
| 20 | −49.79966 | 0.100 | | | |
| 21 | 40.80778 | 6.525 | 1.49700 | 81.61 | |
| 22 | −53.12130 | 1.200 | 1.72916 | 54.68 | |
| 23 | −196.08794 | 0.118 | | | |
| 24 | 43.26818 | 3.220 | 1.59522 | 67.73 | |
| 25 | 273.66697 | 2.500 | | | |
| 26(St) | ∞ | 2.500 | | | |
| 27 | −481.13817 | 1.000 | 1.92119 | 23.96 | G4B |
| 28 | 114.83813 | 1.195 | | | |
| 29 | −163.27031 | 1.200 | 1.91082 | 35.25 | |
| 30 | 99.07055 | 2.444 | | | |
| 31 | −42.95468 | 1.200 | 1.91082 | 35.25 | |
| 32 | 97.42116 | 0.100 | | | |
| 33 | 54.90415 | 3.968 | 1.51742 | 52.43 | |
| 34 | −56.94655 | 3.207 | | | |
| 35 | 209.50265 | 2.898 | 1.59270 | 35.31 | G4C |
| 36 | −67.23878 | 0.100 | | | |
| 37 | 228.22078 | 1.813 | 1.69895 | 30.13 | |
| 38 | −373.07199 | 1.041 | | | |
| 39 | 59.45173 | 2.000 | 1.91082 | 35.25 | |
| 40 | 19.76222 | 5.790 | 1.62004 | 36.26 | |
| 41 | −164.06062 | 0.100 | | | |
| 42 | 35.61581 | 1.463 | 1.76182 | 26.52 | |
| 43 | 38.19232 | 20.000 | | | |
| 44 | −60.34129 | 0.600 | 1.77250 | 49.60 | G4D |
| 45 | 17.93609 | 2.423 | 1.63980 | 34.47 | |
| 46 | 41.43484 | 2.279 | | | |
| 47 | −74.70881 | 1.200 | 1.71300 | 53.87 | |
| 48 | 52.74471 | 0.846 | | | |
| 49 | 47.78185 | 3.430 | 1.51742 | 52.43 | |
| 50 | −31.37690 | 11.570 | | | |
| 51 | 60.13201 | 1.674 | 1.76182 | 26.52 | G4E |
| 52 | 124.28003 | 0.749 | | | |
| 53 | 79.21257 | 2.198 | 1.53775 | 74.70 | |
| 54 | −155.33659 | 1.061 | 1.90366 | 31.31 | |
| 55 | −340.09512 | 17.500 | | | |
| 56 | ∞ | 1.000 | 1.51633 | 64.14 | |
| 57 | ∞ | | | | |

TABLE 6

Example 3

| | WIDE | MIDDLE | TELE |
|---|---|---|---|
| Zr | 1.0 | 19.9 | 38.8 |
| f | 20.006 | 398.702 | 775.222 |
| Bf | 18.964 | 18.964 | 18.964 |
| FNo. | 3.98 | 4.06 | 7.41 |
| 2ω(°) | 25.2 | 1.2 | 0.6 |
| DD[6] | 3.293 | 182.315 | 194.575 |

TABLE 6-continued

Example 3

| | WIDE | MIDDLE | TELE |
|---|---|---|---|
| DD[15] | 181.215 | 3.180 | 12.882 |
| DD[18] | 24.104 | 23.116 | 1.156 |

Example 4

Figure 6:
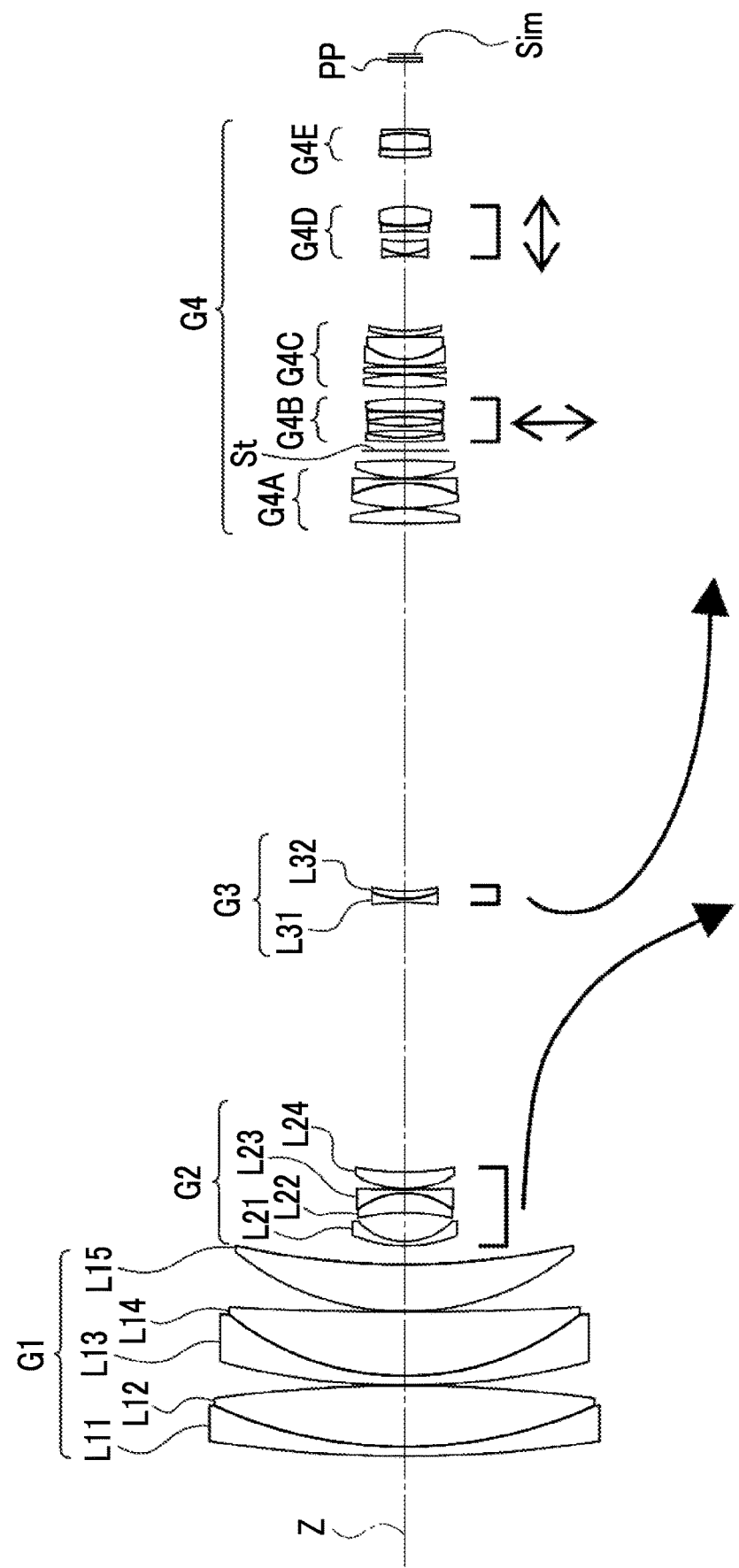
FIG. 6 is a diagram showing a cross-sectional view of a configuration of a zoom lens according to Example 4 of the present disclosure and a movement locus thereof.

FIG. 6 shows a configuration and movement loci of the zoom lens of Example 4. The zoom lens of Example 4 has the same configuration as the outline of the zoom lens of Example 1 except that the fourth D lens group G4D has a negative refractive power and the fourth E lens group G4E has a positive refractive power. Regarding the zoom lens of Example 4, Tables 7A and 7B show basic lens data thereof, Table 8 shows specification and variable surface distances thereof, and FIGS. 14 and 15 show aberration diagrams thereof. FIG. 14 shows aberration diagrams in a state where there is no image blurring. In FIG. 15, the upper part labeled by "no optical system tilt" shows aberrations in the state where there is no image blurring. The lower part labeled by "optical system tilt 0.2° correction" shows aberrations in a state where image blur correction is performed by moving the vibration reduction lens group in a direction perpendicular to the optical axis Z in a case where there is image blurring caused by the optical system tilt of 0.2°.

TABLE 7A

Example 4

| Sn | R | D | Nd | vd | ApD |
|---|---|---|---|---|---|
| 1 | 362.99855 | 2.520 | 1.51742 | 52.43 | 108.00 |
| 2 | 129.66384 | 16.529 | 1.49700 | 81.54 | |
| 3 | −414.92702 | 0.100 | | | |
| 4 | 207.98706 | 2.500 | 1.77250 | 49.60 | |
| 5 | 78.88930 | 17.359 | 1.49700 | 81.54 | |
| 6 | 866.47679 | 0.100 | | | |
| 7 | 76.32522 | 12.609 | 1.49700 | 81.54 | |
| 8 | 216.12498 | DD[8] | | | 92.19 |
| 9 | 38.92646 | 1.200 | 1.67300 | 38.26 | |
| 10 | 18.30641 | 7.720 | | | |
| 11 | −61.40396 | 5.336 | 1.80518 | 25.42 | |
| 12 | −21.86559 | 1.010 | 1.77250 | 49.60 | |
| 13 | 421.07570 | 0.200 | | | |
| 14 | 29.56307 | 4.301 | 1.49700 | 81.61 | |
| 15 | 81.23355 | DD[15] | | | |
| 16 | −67.32270 | 1.010 | 1.49700 | 81.61 | |
| 17 | 24.74416 | 2.054 | 1.85150 | 40.78 | |
| 18 | 38.46267 | DD[18] | | | 18.00 |

TABLE 7B

Example 4

| Sn | R | D | Nd | vd | |
|---|---|---|---|---|---|
| 19 | 192.74324 | 3.993 | 1.49700 | 81.61 | G4A |
| 20 | −62.31118 | 0.100 | | | |
| 21 | 55.74352 | 6.839 | 1.49700 | 81.61 | |
| 22 | −36.32119 | 1.200 | 1.71300 | 53.87 | |
| 23 | 1058.69698 | 0.100 | | | |
| 24 | 36.62192 | 4.854 | 1.67300 | 38.26 | |
| 25 | −174.14221 | 2.610 | | | |
| 26(St) | ∞ | 2.500 | | | |
| 27 | 229.23907 | 1.000 | 1.88300 | 40.80 | G4B |
| 28 | 51.81445 | 1.954 | | | |
| 29 | −127.65723 | 1.200 | 1.91082 | 35.25 | |

TABLE 7B-continued

Example 4

| Sn | R | D | Nd | vd | |
|---|---|---|---|---|---|
| 30 | 57.58005 | 2.533 | | | |
| 31 | −50.75251 | 1.200 | 2.00069 | 25.46 | |
| 32 | 297.64837 | 0.100 | | | |
| 33 | 76.14595 | 3.260 | 1.49700 | 81.61 | |
| 34 | −66.33186 | 3.246 | | | |
| 35 | 124.34793 | 3.294 | 1.49700 | 81.61 | G4C |
| 36 | −60.52177 | 0.100 | | | |
| 37 | 166.84456 | 2.038 | 1.67270 | 32.17 | |
| 38 | −286.17452 | 0.100 | | | |
| 39 | 60.53073 | 2.000 | 1.90366 | 31.31 | |
| 40 | 18.00067 | 6.010 | 1.71736 | 29.52 | |
| 41 | −973.71127 | 0.100 | | | |
| 42 | 33.59586 | 1.572 | 1.49700 | 81.61 | |
| 43 | 37.65328 | 20.000 | | | |
| 44 | −51.83389 | 0.600 | 1.77250 | 49.60 | G4D |
| 45 | 13.14280 | 3.482 | 1.63980 | 34.47 | |
| 46 | 41.72296 | 2.762 | | | |
| 47 | −44.93701 | 1.200 | 1.71300 | 53.87 | |
| 48 | 55.29041 | 0.183 | | | |
| 49 | 30.44194 | 5.164 | 1.51742 | 52.43 | |
| 50 | −23.21226 | 13.275 | | | |
| 51 | 55.32273 | 2.081 | 1.76182 | 26.52 | G4E |
| 52 | 248.35085 | 0.100 | | | |
| 53 | 45.58601 | 4.426 | 1.53775 | 74.70 | |
| 54 | −29.53396 | 1.000 | 1.90366 | 31.31 | |
| 55 | −340.09512 | 18.338 | | | |
| 56 | ∞ | 1.000 | 1.51633 | 64.14 | |
| 57 | ∞ | | | | |

TABLE 8

Example 4

| | WIDE | MIDDLE | TELE |
|---|---|---|---|
| Zr | 1.0 | 19.9 | 38.8 |
| f | 20.019 | 398.965 | 775.733 |
| Bf | 19.992 | 19.992 | 19.992 |
| FNo. | 3.98 | 4.44 | 7.43 |
| 2ω(°) | 24.8 | 1.2 | 0.6 |
| DD[8] | 4.995 | 98.159 | 99.006 |
| DD[15] | 72.672 | 33.551 | 72.942 |
| DD[18] | 99.143 | 45.099 | 4.862 |

Example 5

Figure 7:
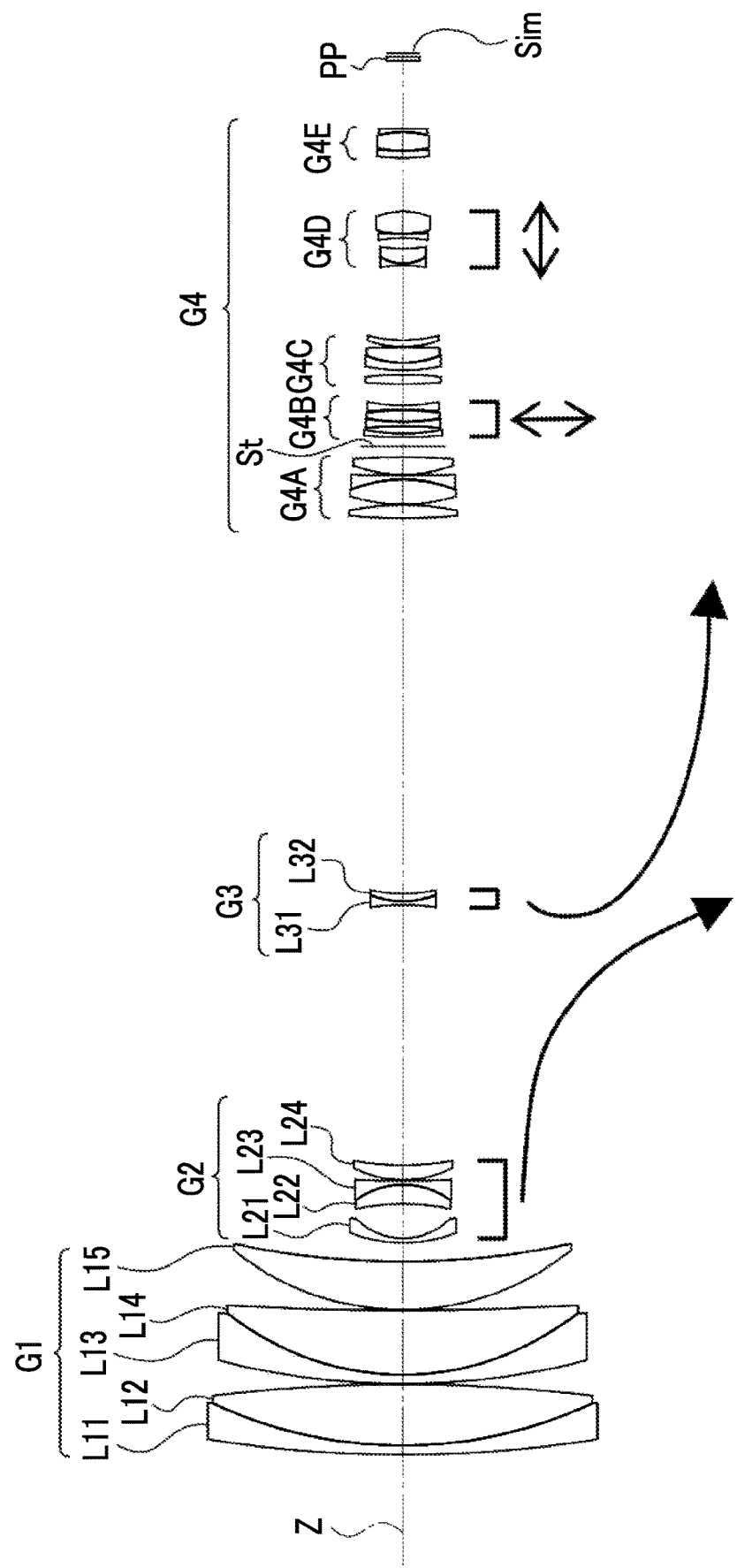
FIG. 7 is a diagram showing a cross-sectional view of a configuration of a zoom lens according to Example 5 of the present disclosure and a movement locus thereof.

FIG. 7 shows a configuration and movement loci of the zoom lens of Example 5. The zoom lens of Example 5 has the same configuration as the outline of the zoom lens of Example 1 except that the fourth D lens group G4D has a negative refractive power and the fourth E lens group G4E has a positive refractive power. Regarding the zoom lens of Example 5, Tables 9A and 9B show basic lens data thereof, Table 10 shows specification and variable surface distances thereof, and FIGS. 16 and 17 show aberration diagrams thereof. FIG. 16 shows aberration diagrams in a state where there is no image blurring. In FIG. 17, the upper part labeled by "no optical system tilt" shows aberrations in the state where there is no image blurring. The lower part labeled by "optical system tilt 0.2° correction" shows aberrations in a state where image blur correction is performed by moving the vibration reduction lens group in a direction perpendicular to the optical axis Z in a case where there is image blurring caused by the optical system tilt of 0.2°.

TABLE 9A

Example 5

| Sn | R | D | Nd | vd | ApD |
|---|---|---|---|---|---|
| 1 | 349.63565 | 2.520 | 1.51742 | 52.43 | 108.00 |
| 2 | 126.26818 | 16.559 | 1.49700 | 81.54 | |
| 3 | −452.03880 | 0.100 | | | |
| 4 | 207.04720 | 2.500 | 1.77250 | 49.60 | |
| 5 | 78.92551 | 17.383 | 1.49700 | 81.54 | |
| 6 | 869.25238 | 0.100 | | | |
| 7 | 76.25998 | 12.982 | 1.49700 | 81.54 | |
| 8 | 229.91086 | DD[8] | | | 92.32 |
| 9 | 40.98470 | 1.288 | 1.67300 | 38.26 | |
| 10 | 18.89714 | 9.226 | | | |
| 11 | −67.18907 | 5.260 | 1.80518 | 25.42 | |
| 12 | −22.55196 | 1.010 | 1.77250 | 49.60 | |
| 13 | 279.47910 | 0.200 | | | |
| 14 | 30.54036 | 4.131 | 1.49700 | 81.61 | |
| 15 | 85.27738 | DD[15] | | | |
| 16 | −69.12868 | 1.010 | 1.49700 | 81.61 | |
| 17 | 24.42935 | 2.060 | 1.85150 | 40.78 | |
| 18 | 37.76113 | DD[18] | | | 18.00 |

TABLE 9B

Example 5

| Sn | R | D | Nd | vd | |
|---|---|---|---|---|---|
| 19 | 193.56423 | 3.574 | 1.49700 | 81.61 | G4A |
| 20 | −75.64224 | 0.100 | | | |
| 21 | 50.79730 | 6.716 | 1.49700 | 81.61 | |
| 22 | −40.21021 | 1.200 | 1.71300 | 53.87 | |
| 23 | 816.22528 | 0.100 | | | |
| 24 | 39.33302 | 4.789 | 1.67300 | 38.26 | |
| 25 | −181.82282 | 2.876 | | | |
| 26(St) | ∞ | 2.500 | | | |
| 27 | 146.59268 | 1.000 | 1.88300 | 40.80 | G4B |
| 28 | 55.45595 | 1.927 | | | |
| 29 | −120.44332 | 1.200 | 1.91082 | 35.25 | |
| 30 | 67.32560 | 0.136 | | | |
| 31 | 63.17526 | 3.016 | 1.49700 | 81.61 | |
| 32 | −82.51947 | 0.100 | | | |
| 33 | −241.60722 | 1.200 | 2.00069 | 25.46 | |
| 34 | 48.01730 | 5.787 | | | |
| 35 | 140.92396 | 2.558 | 1.49700 | 81.61 | G4C |
| 36 | −88.97135 | 1.202 | | | |
| 37 | 54.97038 | 2.000 | 1.90366 | 31.31 | |
| 38 | 28.36519 | 4.222 | 1.71736 | 29.52 | |
| 39 | −208.75157 | 0.100 | | | |
| 40 | 30.56051 | 1.779 | 1.49700 | 81.61 | |
| 41 | 37.46458 | 20.000 | | | |
| 42 | −40.87996 | 0.600 | 1.77250 | 49.60 | G4D |
| 43 | 12.09394 | 3.956 | 1.63980 | 34.47 | |
| 44 | 41.61275 | 2.822 | | | |
| 45 | −47.64354 | 1.200 | 1.71300 | 53.87 | |
| 46 | 68.38378 | 0.100 | | | |
| 47 | 32.54880 | 6.000 | 1.51742 | 52.43 | |
| 48 | −19.88590 | 14.470 | | | |
| 49 | 64.62438 | 1.920 | 1.76182 | 26.52 | G4E |
| 50 | 209.74272 | 0.100 | | | |
| 51 | 38.53732 | 4.924 | 1.53775 | 74.70 | |
| 52 | −28.63726 | 1.000 | 1.90366 | 31.31 | |
| 53 | −340.09512 | 18.334 | | | |
| 54 | ∞ | 1.000 | 1.51633 | 64.14 | |
| 55 | ∞ | | | | |

TABLE 10

Example 5

| | WIDE | MIDDLE | TELE |
|---|---|---|---|
| Zr | 1.0 | 19.9 | 38.8 |
| f | 20.018 | 398.953 | 775.709 |

TABLE 10-continued

| Example 5 | | | |
|---|---|---|---|
| | WIDE | MIDDLE | TELE |
| Bf | 20.004 | 20.004 | 20.004 |
| FNo. | 3.98 | 4.42 | 7.43 |
| 2ω(°) | 24.8 | 1.2 | 0.6 |
| DD[6] | 4.992 | 95.361 | 96.083 |
| DD[15] | 70.062 | 35.144 | 75.085 |
| DD[18] | 100.979 | 45.528 | 4.864 |

Table 11 shows values corresponding to Conditional Expressions (1) to (5) of the zoom lenses of Examples 1 to 5. The values shown in Table 11 are based on the d line. The bottom column of Table 11 shows the value of TL/ft in a case where the total optical length is TL and the focal length of the whole system at the telephoto end is ft. TL/ft is the telephoto ratio. All the telephoto ratios of Examples 1 to 5 are equal to or less than 0.5.

TABLE 11

| Expression No. | | Example 1 | Example 2 | Example 3 | Example 4 | Example 5 |
|---|---|---|---|---|---|---|
| (1) | f4ABC/\|f4D\| | 0.99 | 0.95 | 1.12 | 1.19 | 0.97 |
| (2) | f2/f3 | 0.73 | 0.72 | 0.69 | 0.71 | 0.71 |
| (3) | $(1 - \beta 4B) \times \beta 4CDE$ | −3.09 | −3.19 | −2.98 | −3.54 | −3.25 |
| (4) | $\|(1 - \beta 4D^2) \times \beta 4E^2\|$ | 1.11 | 2.30 | 2.64 | 2.46 | 2.26 |
| (5) | f4ABC/f4D | 0.99 | −0.95 | −1.12 | −1.19 | −0.97 |
| | TL/ft | 0.49 | 0.49 | 0.49 | 0.49 | 0.49 |

For comparison, Table 12 shows the telephoto ratios of Examples 1 to 3 of JP2004-126631A described above, as Comparative Examples 1 to 3, respectively. All the telephoto ratios of Examples 1 to 3 of JP2004-126631A are equal to or greater than 2.

TABLE 12

| | Comparative Example 1 | Comparative Example 2 | Comparative Example 3 |
|---|---|---|---|
| TL/ft | 2.03 | 2.01 | 2.02 |

As can be seen from the data described above, in the zoom lenses of Examples 1 to 5, the telephoto ratio is equal to or less than 0.5 while the focal length of the whole system at the telephoto end is equal to or greater than 770, and each zoom lens achieves an increase in focal length on the telephoto side and reduction in total optical length. Each zoom lens of Examples 1 to 5 is able to correct image blurring in a case where there is an optical system tilt of 0.2° at the telephoto end, and realize a large vibration reduction angle. The zoom lenses of Examples 1 to 5 each have a small focusing lens group, and various aberrations are satisfactorily corrected, thereby realizing high optical performance.

Figure 18:
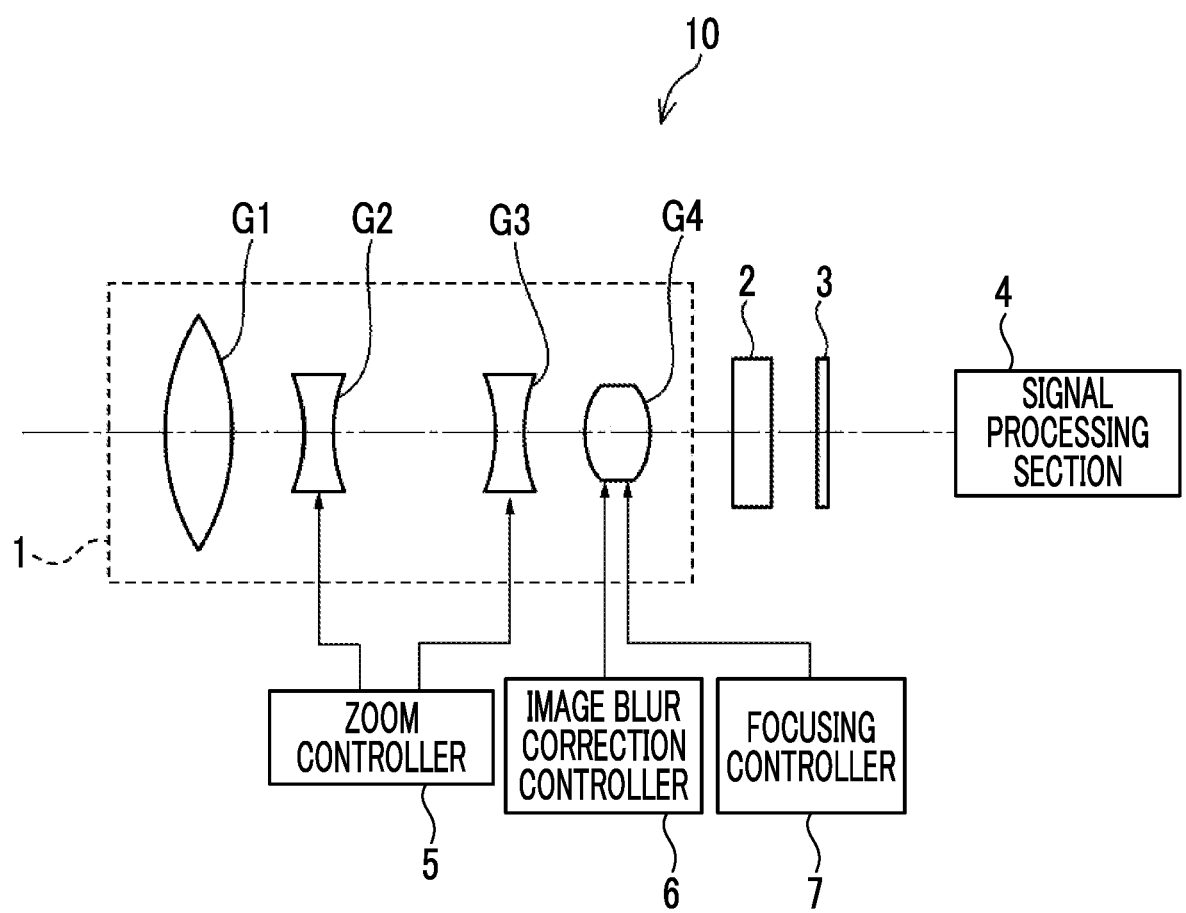
FIG. 18 is a schematic configuration diagram of an imaging apparatus according to an embodiment of the present disclosure.

Next, an imaging apparatus according to an embodiment of the present disclosure will be described. FIG. 18 is a schematic configuration diagram of an imaging apparatus 10 using the zoom lens 1 according to the above-mentioned embodiment of the present disclosure as an example of an imaging apparatus of an embodiment of the present disclosure. Examples of the imaging apparatus 10 include a surveillance camera, a video camera, and the like.

The imaging apparatus 10 comprises the zoom lens 1, a filter 2 disposed on the image side of the zoom lens 1, an imaging element 3 disposed on the image side of the filter 2, and a signal processing section 4 which performs arithmetic processing of output signals issued from the imaging element 3. FIG. 18 conceptually shows the first to fourth lens groups G1 to G4. The imaging apparatus 10 also comprises a zoom controller 5 that controls zooming, an image blur correction controller 6 that controls image blur correction, and a focusing controller 7 that controls focusing.

The imaging element 3 converts an optical image, which is formed through the zoom lens 1, into an electrical signal. For example, it is possible to use a charge coupled device (CCD), complementary metal oxide semiconductor (CMOS), or the like. The imaging element 3 is disposed such that the imaging surface thereof is coplanar with the image plane Sim of the zoom lens 1. Although only one imaging element 3 is shown in FIG. 18, a so-called three-plate imaging apparatus having three imaging elements may be used.

The technology of the present disclosure has been hitherto described through embodiments and examples, but the technology of the present disclosure is not limited to the above-mentioned embodiments and examples, and may be modified into various forms. For example, values such as the radius of curvature, the surface spacing, the refractive index, and the Abbe number of each lens component are not limited to the values shown in the numerical examples, and different values may be used therefor.

What is claimed is:

1. A zoom lens consisting of, in order from an object side to an image side:
a first lens group that has a positive refractive power;
a second lens group that has a negative refractive power;
a third lens group that has a negative refractive power; and
a fourth lens group that has a positive refractive power,
wherein the fourth lens group includes only five lens groups, as lens groups, which consists of, in order from the object side to the image side, a fourth A lens group which has a positive refractive power, a fourth B lens group which has a negative refractive power and moves in a direction intersecting with an optical axis during image blur correction, a fourth C lens group which has a positive refractive power, a fourth D lens group which moves along the optical axis during focusing, and a fourth E lens group which has a refractive power with a sign different from that of a refractive power of the fourth D lens group,
a stop is disposed on the image side from a surface closest to the image side in the third lens group,
during zooming from a wide-angle end to a telephoto end, the second lens group moves to the image side, the third lens group moves to the image side after moving to the object side, and the first lens group, the stop, the fourth A lens group, the fourth B lens group, the fourth C lens group, and the fourth E lens group remain stationary with respect to an image plane, during image blur correction, the fourth A lens group and the fourth C lens group remain stationary with respect to the image plane, during focusing, the lens groups other than the fourth D lens group remain stationary with respect to the image plane, and assuming that a composite focal length of the fourth A lens group, the fourth B lens group, and the fourth C lens group is f4ABC, and a focal length of the fourth D lens group is f4D, Conditional Expression (1) is satisfied, which is represented by $$0.5 < |f4ABC/f4D| < 3 \quad (1).$$

2. The zoom lens according to claim 1, wherein assuming that a focal length of the second lens group is f2, and a focal length of the third lens group is f3, Conditional Expression (2) is satisfied, which is represented by $$0.4 \le f2/f3 < 1.5 \quad (2).$$

3. The zoom lens according to claim 2, wherein Conditional Expression (2-1) is satisfied, which is represented by $$0.5 \le f2/f3 < 0.9 \quad (2\text{-}1).$$

4. The zoom lens according to claim 1, wherein the second lens group includes a cemented lens formed by cementing a positive lens and a negative lens in order from the object side and having a cemented surface concave toward the object side.

5. The zoom lens according to claim 1, wherein assuming that a lateral magnification of the fourth B lens group at the telephoto end in a state where an object at infinity is in focus is β4B, and a composite lateral magnification of the fourth C lens group, the fourth D lens group, and the fourth E lens group at the telephoto end in a state where the object at infinity is in focus is β4CDE, Conditional Expression (3) is satisfied, which is represented by $$-5 < (1-\beta 4B) \times \beta 4CDE < -1 \quad (3).$$

6. The zoom lens according to claim 5, wherein Conditional Expression (3-1) is satisfied, which is represented by $$-4 < (1-\beta 4B) \times \beta 4CDE < -1.5 \quad (3\text{-}1).$$

7. The zoom lens according to claim 1, wherein assuming that a lateral magnification of the fourth D lens group at the telephoto end in a state where an object at infinity is in focus is β4D, and a lateral magnification of the fourth E lens group at the telephoto end in a state where the object at infinity is in focus is β4E, Conditional Expression (4) is satisfied, which is represented by $$0.5 < |(1-\beta 4D^2) \times \beta 4E^2| < 4 \quad (4).$$

8. The zoom lens according to claim 7, wherein Conditional Expression (4-1) is satisfied, which is represented by $$1.5 < |(1-\beta 4D^2) \times \beta 4E^2| < 2.8 \quad (4\text{-}1).$$

9. The zoom lens according to claim 1, wherein the stop is disposed between the fourth A lens group and the fourth B lens group.

10. The zoom lens according to claim 1, wherein the number of lenses composing the fourth D lens group is four or less.

11. The zoom lens according to claim 1, wherein the fourth D lens group has a negative refractive power, and the fourth E lens group has a positive refractive power.

12. The zoom lens according to claim 11, wherein Conditional Expression (5) is satisfied, which is represented by $$-3 < f4ABC/f4D < -0.6 \quad (5).$$

13. The zoom lens according to claim 12, wherein Conditional Expression (5-1) is satisfied, which is represented by $$-1.4 < f4ABC/f4D < -0.7 \quad (5\text{-}1).$$

14. The zoom lens according to claim 1, wherein the fourth A lens group consists of, in order from the object side to the image side, a single lens which has a positive refractive power, a cemented lens which has a positive refractive power as a whole, and a single lens which has a positive refractive power, and the cemented lens of the fourth A lens group is formed by cementing a biconvex lens and a negative lens in order from the object side.

15. The zoom lens according to claim 1, wherein the fourth B lens group consists of three single lenses each of which has a negative refractive power and one positive lens, and two single lenses among the three single lenses each of which has a negative refractive power are successively disposed in order from a position closest to the object side in the fourth B lens group.

16. The zoom lens according to claim 1, wherein Conditional Expression (1-1) is satisfied, which is represented by $$0.8 < |f4ABC/f4D| < 1.5 \quad (1\text{-}1).$$

17. An imaging apparatus comprising the zoom lens according to claim 1.

* * * * *